US012441131B2

(12) United States Patent
Wolter et al.

(10) Patent No.: US 12,441,131 B2
(45) **Date of Patent: *Oct. 14, 2025**

(54) STAMPING KIT, COMPONENTS THEREOF, AND METHODS OF USE

(71) Applicant: Wolter Corp., Edgewood, NY (US)

(72) Inventors: Jeff Wolter, Commack, NY (US); John Kraljic, Riverhead, NY (US); Rita Pannulla, Patchogue, NY (US); Adam Wolter, Syosset, NY (US); James Caruso, Holbrook, NY (US)

(73) Assignee: WOLTER CORP., Edgewood, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/344,976

(22) Filed: Jun. 30, 2023

(65) Prior Publication Data

US 2023/0339246 A1 Oct. 26, 2023

Related U.S. Application Data

(63) Continuation-in-part of application No. 17/713,495, filed on Apr. 5, 2022, now Pat. No. 11,712,914.

(51) Int. Cl.
*B41K 3/36* (2006.01)
*B41K 3/26* (2006.01)

(52) U.S. Cl.
CPC . *B41K 3/26* (2013.01); *B41K 3/36* (2013.01)

(58) Field of Classification Search
CPC ... B41K 3/26; B41K 3/36; B41K 1/40; B41K 1/02; B41K 1/06; B41K 1/20; B41K 3/00;
(Continued)

(56) References Cited

U.S. PATENT DOCUMENTS 808,422 A * 12/1905 Wilson et al. ........... B41K 1/20 33/622
880,883 A * 3/1908 Harton ..................... B41K 1/20 33/622
(Continued)

FOREIGN PATENT DOCUMENTS

CN 109353135 A * 2/2019 ............... B41K 3/04
CN 210909719 U * 7/2020
(Continued)

*Primary Examiner* — Christopher E Mahoney
*Assistant Examiner* — Marissa Ferguson-Samreth
(74) *Attorney, Agent, or Firm* — CARTER, DELUCA & FARRELL LLP

(57) ABSTRACT

A stamping kit is disclosed. The stamping kit includes a jig, a card, and a plurality of stamps. The jig includes an upper surface, a lower surface, a front surface, a rear surface, a card slot, and a stamping slot. The card slot extends between he front surface and the rear surface, and defines a width and a height. The stamping slot extends between the upper surface and the card slot, and defines a width and a length. The card defines a width and a thickness, and is configured to slide within the card slot of the jig. Each stamp of the plurality of stamps has a proximal end configured to be engaged by a hammer, and a distal end having a character thereon. A distal portion of each stamp is configured and dimensioned to enter the stamping slot of the jig.

18 Claims, 32 Drawing Sheets

(58) Field of Classification Search
CPC ... B41K 3/02; B41K 3/24; B41K 3/44; B41K 3/46; B41K 3/54; B41K 3/62
See application file for complete search history.

(56) References Cited

U.S. PATENT DOCUMENTS

| | | | | |
|---|---|---|---|---|
| 3,452,675 | A | 7/1969 | Whitelock | |
| 4,688,333 | A * | 8/1987 | Welch | B41K 1/06 33/1 AA |
| 11,712,914 | B1 | 8/2023 | Wolter et al. | |
| 2006/0101946 | A1 | 5/2006 | Oh | |
| 2010/0085393 | A1 * | 4/2010 | Matsumoto | G07C 1/02 346/80 |
| 2011/0041662 | A1 * | 2/2011 | Lynen | B26F 1/36 83/684 |

FOREIGN PATENT DOCUMENTS

| | | | | |
|---|---|---|---|---|
| JP | 2001047722 | A | 2/2001 | |
| WO | WO-2020080508 | A1 * | 4/2020 | H01J 37/20 |

* cited by examiner

FIG.9
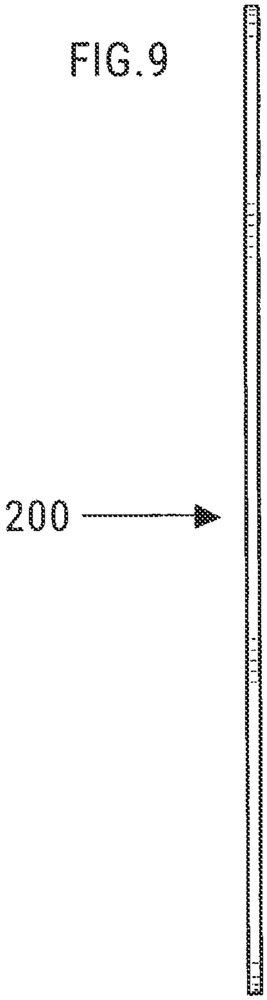
FIG.10
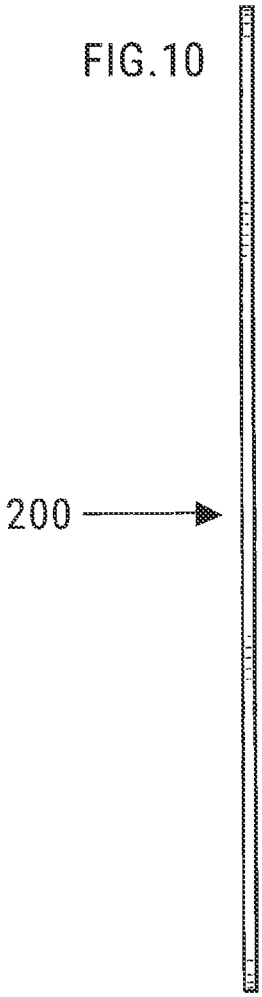
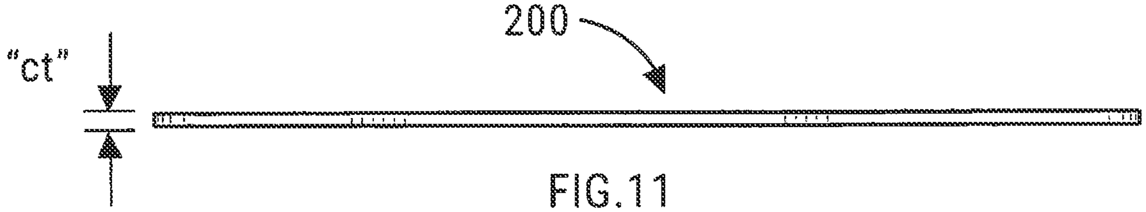
FIG.11
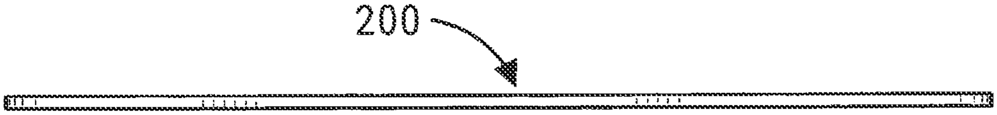
FIG.12

STAMPING KIT, COMPONENTS THEREOF, AND METHODS OF USE

CROSS-REFERENCE TO RELATED APPLICATION

The present application is a continuation-in-part of U.S. patent application Ser. No. 17/713,495, filed on Apr. 5, 2022, the entire contents of which are incorporated herein by reference.

BACKGROUND

The present disclosure relates to a stamping kit, components thereof, and methods of use. More particularly, the disclosure relates to a kit and its various components used to stamp or imprint characters or designs onto items such as metal cards, and associated methods.

Various types of stamping products are used to imprint letters or numbers onto metal cards, for instance. Such products may include a hammer, a plurality of stamps, and a substrate or blank on which to imprint the stamped design, for example.

When novices and experts alike attempt to stamp a particular series of characters using various stamps to form a word, name, or phrase, for instance, it may be challenging to perfectly align and space adjacent characters thereby resulting in a less-than-perfect final product. Moreover, it may also be challenging to properly imprint each character onto the blank or substrate, especially for beginners, as the stamps may slightly move, wander, or bounce while being hammered. As a result, the stamped blank may not only look amateurish, but the characters on the stamped blank may also be hard or impossible to decipher.

While imperfectly-stamped products such as jewelry or ornaments may be merely an aesthetic nuisance, imperfectly-stamped cards including passwords or seed words/phrases for cryptocurrency can be severely consequential.

More specifically, it is well known to back up passwords and passphrases onto a storage medium that is not connected to the internet or even to a computer, as computers are susceptible to fail at some point. While many people simply write down their passwords on paper, this method also has associated risks including misplacing the paper, fading ink, and fire, for instance. In certain situations, such as for various forms of cryptocurrency, it is impossible to recover lost passwords, seed words, or phrases.

Accordingly, a kit that allows or enables characters to be permanently and legibly imprinted onto a medium may be desirable.

SUMMARY

The present disclosure relates to a stamping kit. The stamping kit includes a jig, a card, and a plurality of stamps. The jig includes an upper surface, a lower surface, a front surface, a rear surface, a card slot, and a stamping slot. The card slot extends between he front surface and the rear surface, and defines a width and a height. The stamping slot extends between the upper surface and the card slot, and defines a width and a length. The card defines a width and a thickness, and is configured to slide within the card slot of the jig. Each stamp of the plurality of stamps has a proximal end configured to be engaged by a hammer, and a distal end having a character thereon. A distal portion of each stamp is configured and dimensioned to enter the stamping slot of the jig.

In disclosed embodiments, the width of the card slot of the jig is approximately equal to the width of the card.

It is also disclosed that the height of the card slot of the jig is approximately equal to the thickness of the card.

It is further disclosed that a length of the distal portion of each stamp of the plurality of stamps is approximately equal to the length of the stamping slot of the jig.

In disclosed embodiments, the jig includes a plurality of alignment marks disposed on the upper surface adjacent the stamping slot. In embodiments, each stamp of the plurality of stamps includes an alignment mark on the distal portion.

Additionally, it is disclosed that the jig includes between eight and 16 alignment marks disposed on the upper surface adjacent the stamping slot.

In disclosed embodiments, the jig includes a plastic layer, a steel layer, and a rubber layer.

It is further disclosed that an entirety of the card is made from titanium. In embodiments, the thickness of the card is 2 mm.

It is also disclosed that the stamping kit includes a hammer configured to individually engage the proximal end of each stamp of the plurality of stamps.

In embodiments, the card includes at least 12 enumerated lines.

The present disclosure also relates to a stamping kit including a card, a stamp, and a jig. The jig including a card slot and a stamping slot. The card slot is configured and dimensioned to allow the card to pass therethrough. The stamping slot is configured and dimensioned to allow a distal portion of the stamp to enter therein. The card slot is perpendicular to the stamping slot.

In disclosed embodiments, the card is made entirely from grade 3 commercial titanium. In embodiments, the card is 2 mm thick, and the card slot defines a height of about 2 mm.

It is also disclosed that the jig includes a plastic portion, a steel portion, and a rubber portion. In embodiments, the rubber portion is overmolded through part of the plastic portion and through part of the steel portion.

It is further disclosed that the card defines a width of about 3 inches, and the card slot of the jig defines a width of about 3 inches.

BRIEF DESCRIPTION OF THE DRAWINGS

Embodiments of the present disclosure are described hereinbelow with reference to the drawings wherein:

FIG. 9 is a right side view of the card of FIG. 6;

FIG. 10 is a left side view of the card of FIG. 6;

FIG. 11 is a front view of the card of FIG. 6;

FIG. 12 is a rear view of the card of FIG. 6;

DETAILED DESCRIPTION

Figure 1:
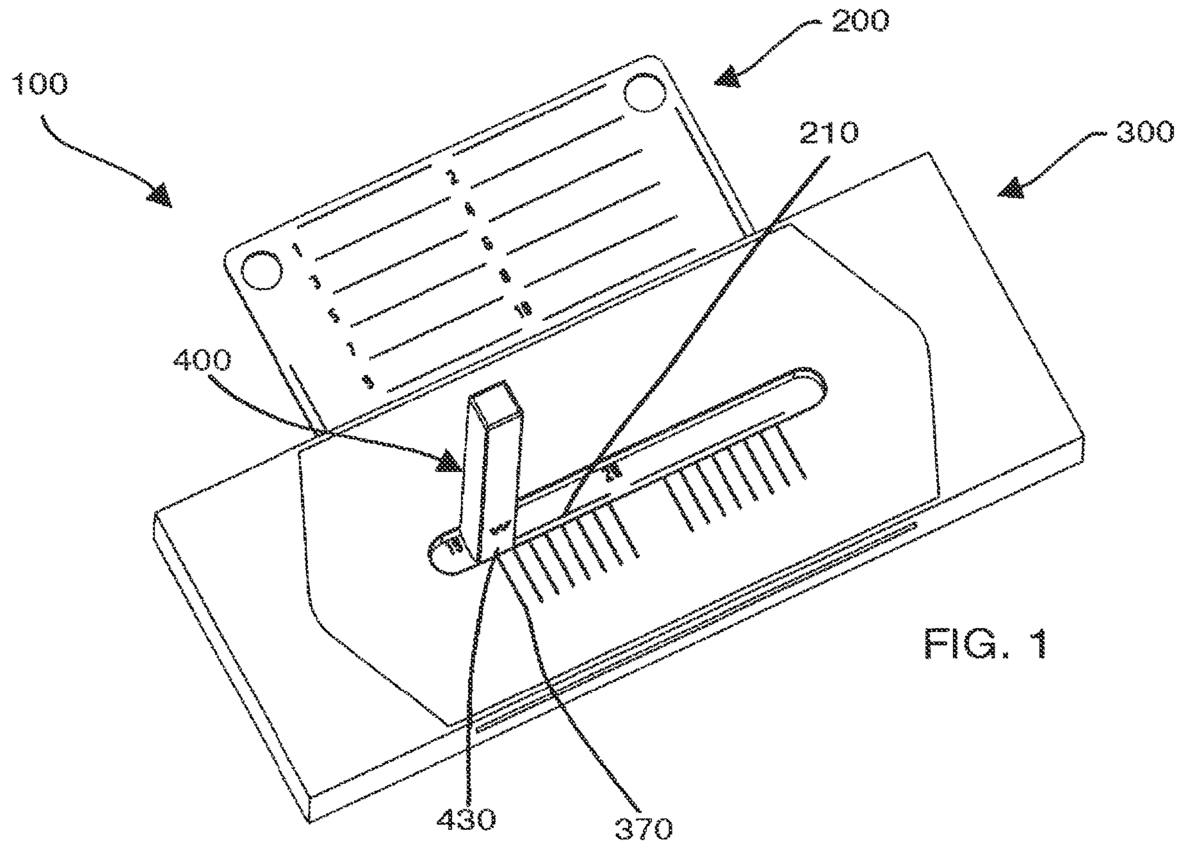
FIGS. 1-4 are various views of components of a stamping kit in accordance with the present disclosure.
Figure 2:
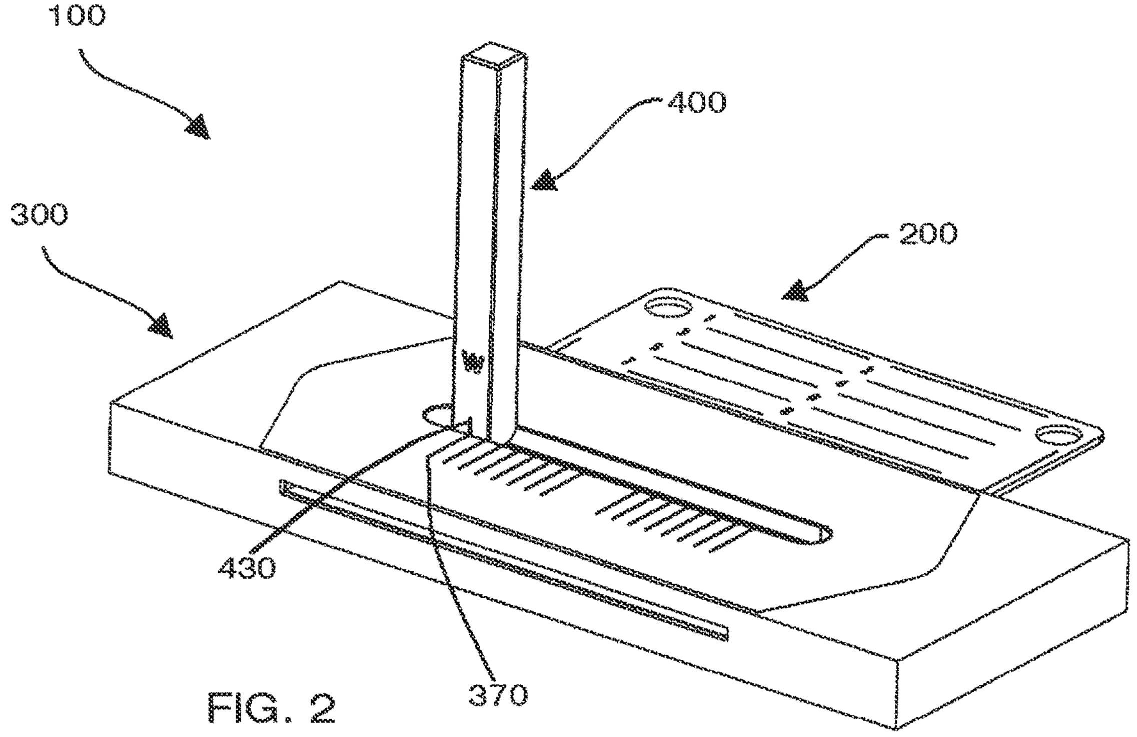
Figure 3:
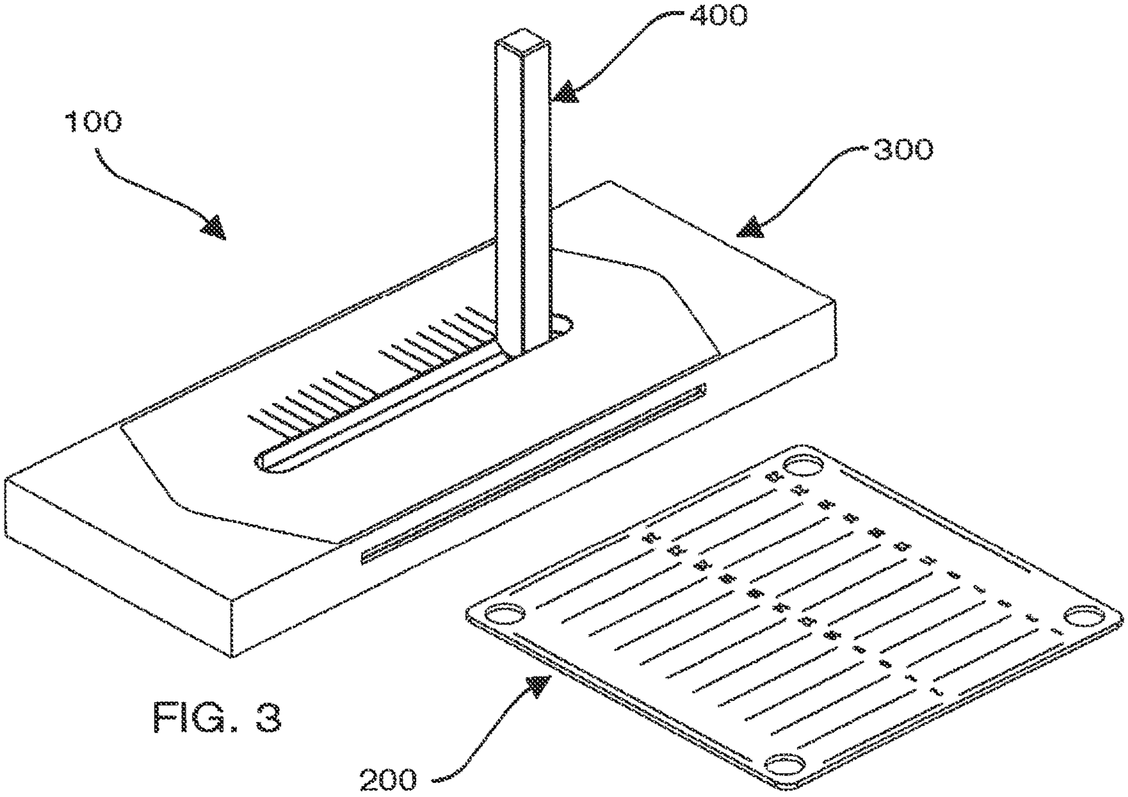
Figure 4:
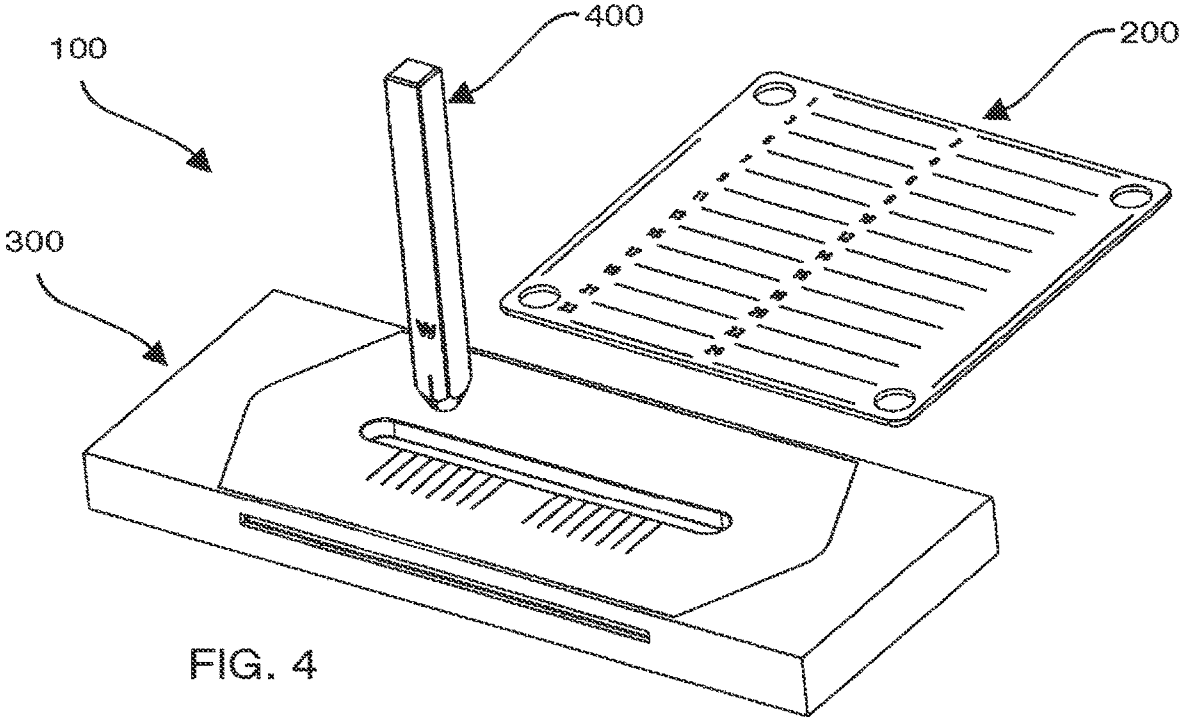

Embodiments of the presently disclosed stamping kit and components thereof are now described in detail with reference to the drawings, in which like reference numerals designate identical or corresponding elements in each of the several views. As used herein the term "distal" refers to that portion of the stamping kit, or component thereof, farther from a user, while the term "proximal" refers to that portion of the stamping kit, or component thereof, closer to the user.

Figure 5:
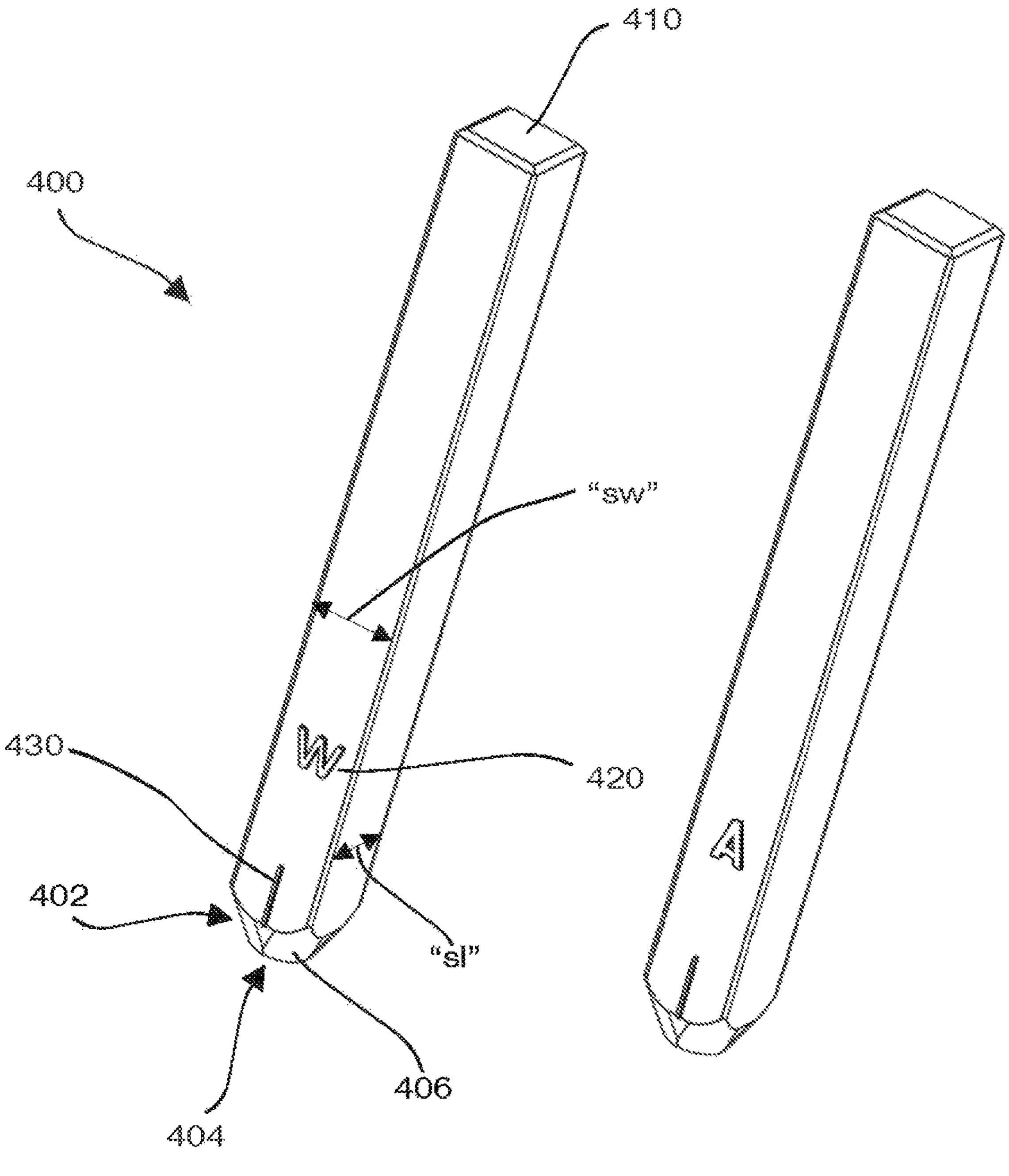
FIG. 5 is a perspective view of two representative stamps of a plurality of stamps of the stamping kit of FIGS. 1-4.
Figure 6:
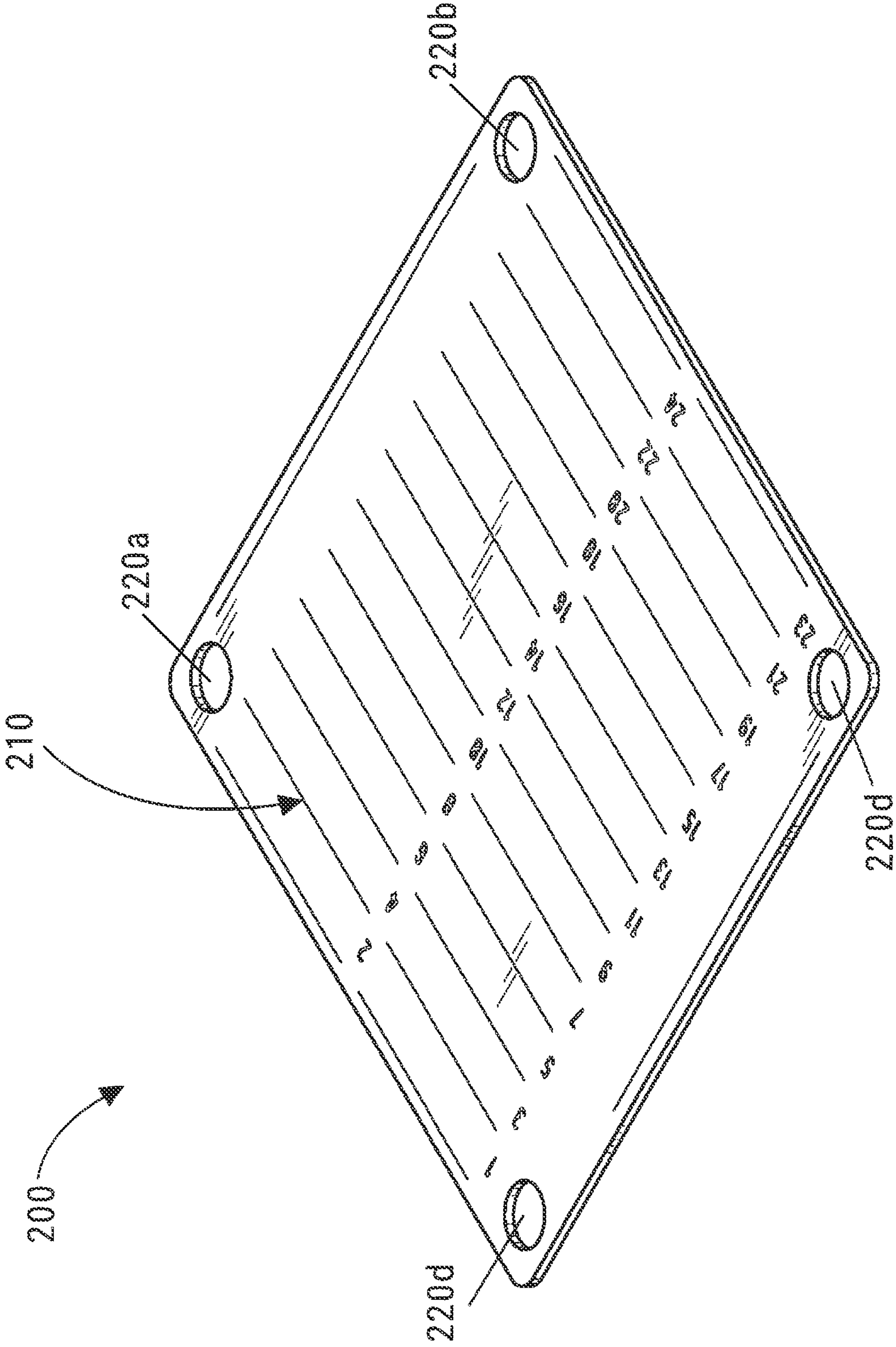
FIG. 6 is a perspective view of an embodiment of a card of the stamping kit of FIGS. 1-4.
Figure 7:
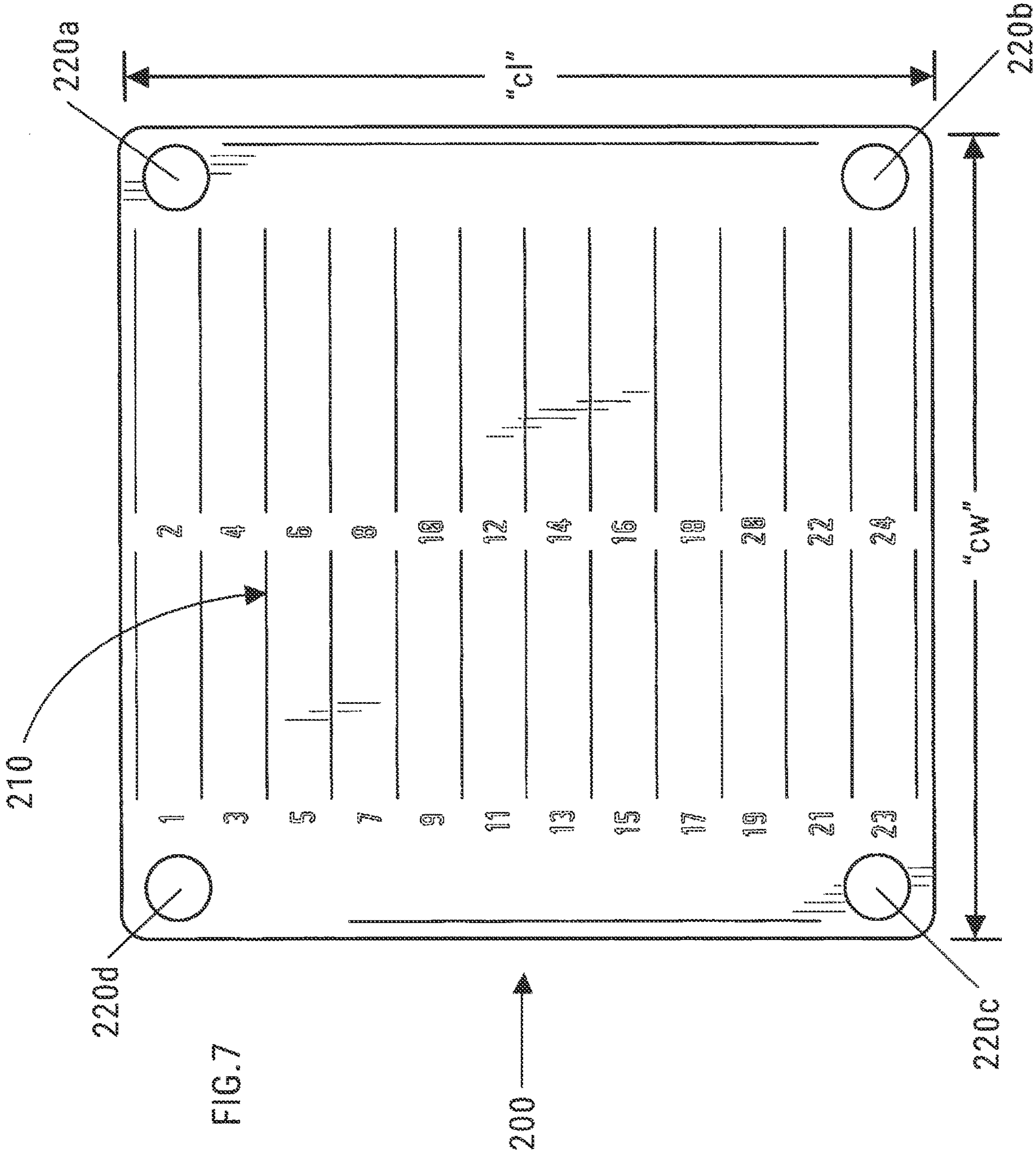
FIG. 7 is a top view of the card of FIG. 6.
Figure 8:
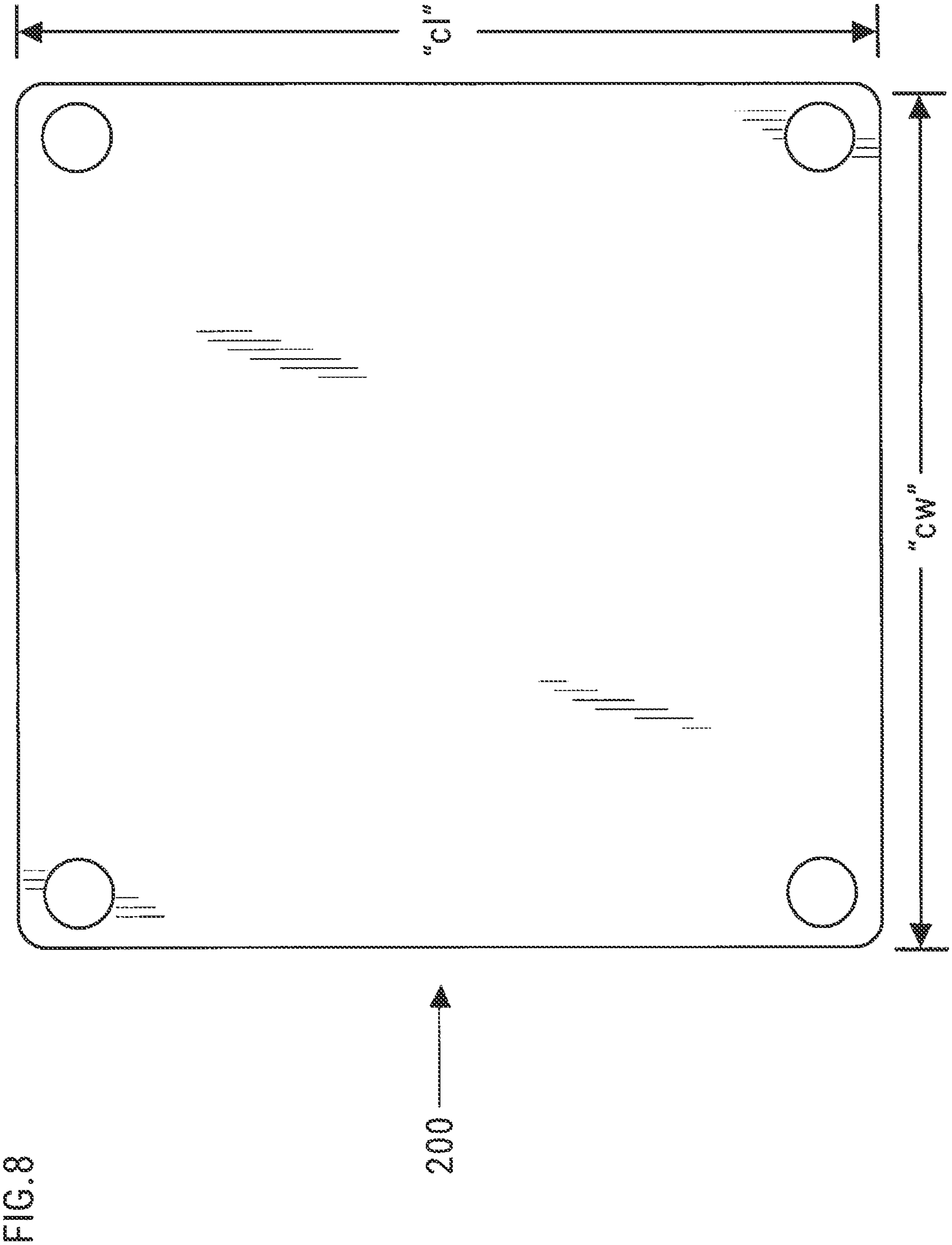
FIG. 8 is a bottom view of the card of FIG. 6.

An embodiment of a stamping kit is illustrated in the accompanying figures and is generally referenced by numeral 100. The stamping kit 100 includes any or all of the following: at least one card 200 (FIGS. 1-4 and 6-12); at least one jig 300 (FIGS. 1-4 and 13-19); a plurality of stamps 400 (FIGS. 1-5; two stamps are shown in FIG. 5; for clarity, a single stamp is referred to as "stamp 400"); and at least one first hammer 500*a* (FIGS. 20-26), second hammer 500*b* (FIGS. 27-33), and/or third hammer 500*c* (FIGS. 34-40). The first hammer 500*a*, the second hammer 500*b*, and third hammer 500*c* are collectively referred to as hammer 500, herein.

Generally, and with reference to FIGS. 1-4, a user utilizes the stamping kit 100 to stamp or imprint characters from the plurality of stamps 400 onto the card 200 with the aid of the jig 300 and/or the hammer 500 (FIGS. 20-40). More specifically, and as described in further detail below, a user can position the card 200 partially within the jig 300, use the jig 300 to help position the stamp 400 at a desired location on the card 200, and use the hammer 500 to hit the stamp 400 thereby imprinting a character on the stamp 400 onto the card 200. As used herein, the term "character" is meant to include at least one letter, at least one number, a design, an emoji, a symbol, and the like.

With reference to FIG. 5, a representative stamp 400 of the plurality of stamps 400 is shown. The stamp 400 includes a distal portion 402 configured for insertion into a stamping slot 360 of the jig 300 (discussed in further detail below), and a proximal end 410 configured to be engaged with the hammer 500. The stamp 400 also includes a first indicia 420, which indicates which character is on a distal end 404 of the stamp 400. Additionally, as indicated below, the stamp 400 includes a stamp marker 430 at the distal portion 402 thereof. As shown, the stamp 400 includes a tapered portion 406 adjacent the distal end 404.

With particular regard to FIGS. 6-12, the card 200 is shown. The card defines a width "cw," a length "cl," and a thickness "ct," and is configured to have characters imprinted thereon. Additionally, in the illustrated embodiment, the card 200 includes 24 enumerated lines 210 thereon. While 24 enumerated lines 210 are illustrated, the carte 200 may include more or fewer than 24 enumerated lines without departing from the scope of the disclosure. The enumerated lines 210 are configured to help align and/or organize various words, symbols and/or phrases, such as seed words for cryptocurrency wallets. Some types of cryptocurrency utilize 12 seed words, and some types of cryptocurrency utilize 24 seed words. Thus, the illustrated card 200 can be useful to store the seed words for both of these types of cryptocurrency, in addition to cryptocurrency that may utilize fewer seed words. Further, the card 200 can be useful to store any type of words, including passwords or user IDs, and can also be configured to store more than 24 words without departing from the scope of the present disclosure. As used herein, the term "word" or "words" is intended to include any string of characters.

The card 200 in the illustrated embodiment defines a rectangle (inclusive of a square), and includes a card width "cw" of between about 6.35 cm (or about 2.5 inches) and about 8.89 cm (or about 3.5 inches) (e.g., equal to 7.62 cm or 3.0 inches), a length "cl" of between about 6.35 cm (or about 2.5 inches) and about 8.89 cm (or about 3.5 inches) (e.g., equal to 7.62 cm or 3.0 inches), and defines a card thickness "ct" of between about 1.5 mm (or about 0.06 inches) and about 2.5 mm (or about 0.1 inches) (e.g., equal to 2 mm or about 0.079 inches). In the illustrated embodiment, the card width "cw" is equal to the card length "cl." As discussed below, the dimensions of the card 200 enable the card 200 to fit within the jig 300 snugly.

In embodiments, at least a portion of (including an entirety of) the card 200 is made from titanium or a titanium alloy. Titanium is a suitable material for the card 200 because it is waterproof, non-corrosive (highly resistant to rusting and saltwater), fire resistant, and crush proof. Accordingly, cards 200 made from titanium are able to withstand various situations (including fires, floods, etc.) while still having the characters imprinted thereon being legible.

In embodiments, the entire card 200 is made from Grade 3 commercial titanium, is 2 mm thick, defines a length of 7.62 cm (3.0 inches), and defines a width of 7.62 cm (3.0 inches). The particular thickness of 2 mm, as disclosed herein, along with the card 200 being made from Grade 3 commercial titanium, has been found to reduce vibration of the card 200 during stamping, to enable the card 200 to remain flat while undergoing the forces associated with being stamped, and allows the stamp 400 to penetrate the card 200 an appropriate depth such that the characters imprinted that are imprinted on the card 200 are legible. More particularly, if the card 200 is too thin (and/or made from too weak a grade of titanium), the card 200 will curl or bend during the stamping process, which may result in the card 200 becoming stuck in the jig 300. If the card 200 is too thick (and/or made from too strong a grade of titanium), it is challenging to create the proper amount of force with the hammer 500 against the proximal end 410 of the stamp 400 to sufficiently imprint the character on the stamp 400 onto the card 200.

With continued reference the embodiment of the card 200 illustrated in FIGS. 6-12, the card 200 defines four apertures 220*a-d* (collectively, aperture 220), with each aperture 220 defined near a corner of the card 200. One or more of the apertures 220*a-d* (individually or in combination) may be useful to secure multiple cards 200 together with a locking mechanism, for instance.

Referring now to FIGS. 13-19, an embodiment of the jig 300 is shown. The jig 300 includes an upper surface 310, a lower surface 320, a front surface 330, a rear surface 340, a card slot 350, and a stamping slot 360. The card slot 350 extends between the front surface 330 and the rear surface 340 and is configured to accept the card 200 therethrough. The stamping slot 360 extends between the upper surface 310 and the card slot 350 and is configured to accept a portion of the stamp 400 therethrough. In the illustrated embodiment, the stamping slot 360 is perpendicular to the card slot 350. More particularly, the direction of a height "ssh" of the stamping slot 360 is perpendicular to the direction of a length "csl" of the card slot 350.

Moreover, the card slot 350 is dimensioned and configured such that the card 200 is able to snugly pass through. Further, the card slot 350 defines a width "csw" and a height "csh." In embodiments, the width "csw" of the card slot 350 is approximately equal to the width "cw" of the card 200 (e.g., about 3.0 inches), and the height "csh" of the card slot 350 is approximately equal to the thickness "ct" of the card (e.g., about 2 mm).

In the illustrated embodiment, the width "csw" of the card slot 350 is slightly larger than the width "cw" of the card 200, and the height "csh" of the card slot 350 is slightly larger than the thickness "ct of the card 200 to allow the card 200 to be passed through the card slot 350 with minimal play. In embodiments, the width "csw" of the card slot 350 and the height "csh" of the card slot are between about 0.25% and about 2% larger than the respective dimensions of the card 200 to help ensure a sufficient fit. Moreover, in embodiments, the width "csw" of the card slot 350 is equal to about 3.016 inches, and the height "csh" of the card slot 350 is equal to about 0.08 inches. As used herein, the term "approximately equal" and "about" (or similar) is intended to encompass such a difference in sizes.

The stamping slot 360 of the jig 300 is dimensioned and configured to accept a portion of the stamp 400 therein and to align the stamp 400 for imprinting its character onto the card 200. Further, the stamping slot 360 defines a length "ssl," a width "ssw," and a height "ssh." In embodiments, the length "ssl" of the stamping slot 360 is between about 0.20 inches and about 0.30 inches (e.g., equal to about 0.254 inches), and the width "ssw" of the stamping slot 360 is between about 2.5 inches and about 2.75 inches (e.g., equal to about 2.688 inches). In embodiments, the height "ssh" of the stamping slot 360 is between about 0.175 inches and about 0.235 inches (e.g., equal to about 0.21 inches).

In the illustrated embodiment, the length "ssl" of the stamping slot 360 is slightly larger than a length "sl" of the distal portion 402 of the stamp 400 (FIG. 5) to allow the distal portion 402 of the stamp 400 to be positioned within the stamping slot 360 with minimal play, as discussed in further detail below. The width "ssw" of the stamping slot 360 is sufficient such that two, side-by-side enumerated lines 210 of the card are visible through the stamping slot 360 when the card 200 is appropriately positioned within the card slot 350 of the jig 300.

With continued reference to FIGS. 13-19, the jig 300 includes a plurality of alignment marks 370 adjacent the stamping slot 360. Moreover, the alignment marks 370 may be in contact with a wall defining the stamping slot 360. The alignment marks 370 are configured to help achieve desired alignment and spacing of adjacent characters of words, for instance, by acting as a guide for a user to position the stamp marker 430 of the stamp 400 (FIG. 5) there along or in juxtaposition therewith (and see FIGS. 1 and 2). In the illustrated embodiment, the jig 300 includes 16 alignment marks 370, positioned in two sets of eight alignment marks 370. Each set of eight alignment marks 370 is configured to align with one enumerated line 210 of the card 200, as shown in FIG. 1.

Figure 18:
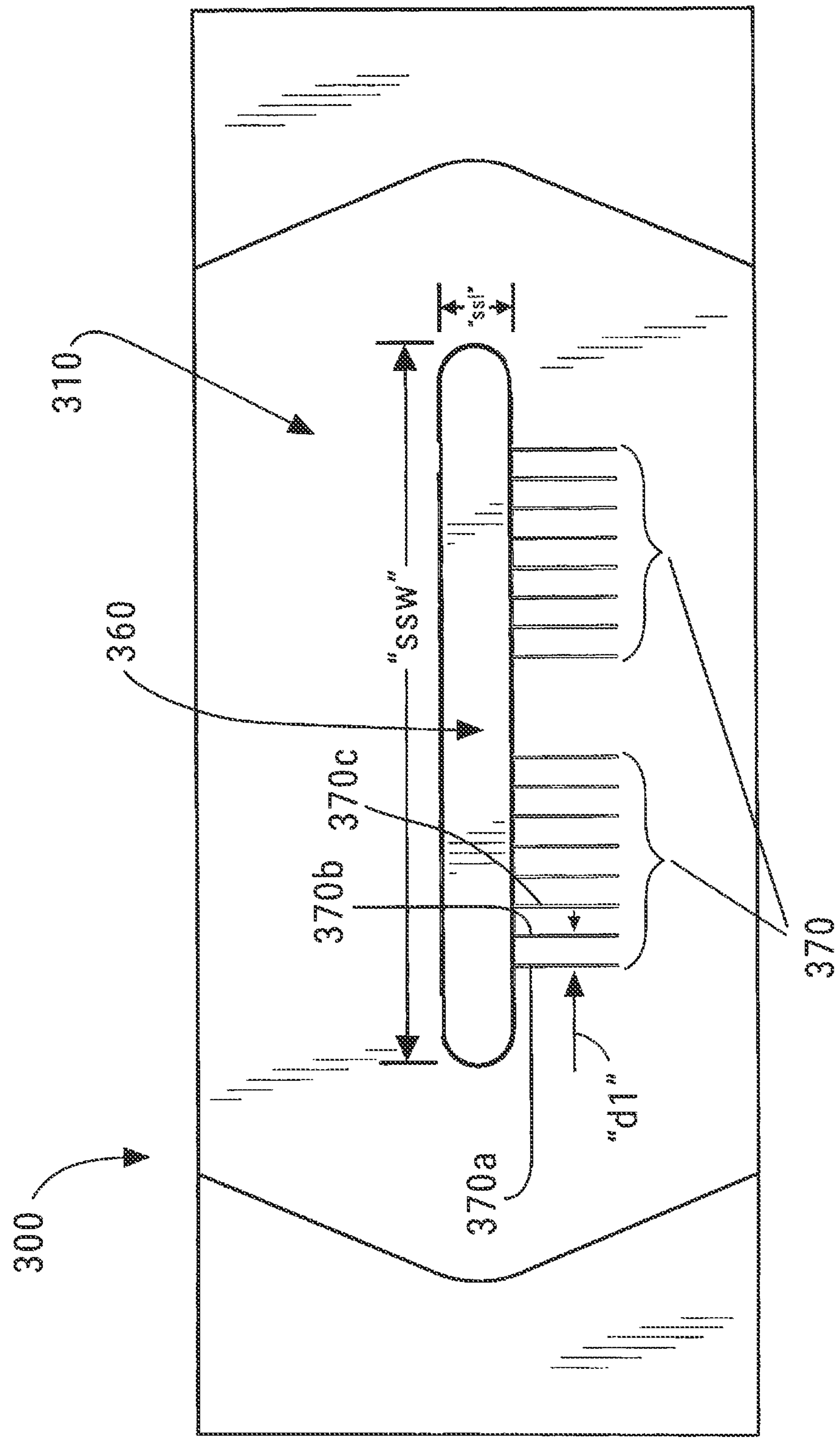
FIG. 18 is a top view of the jig of FIG. 13.
Figure 19:
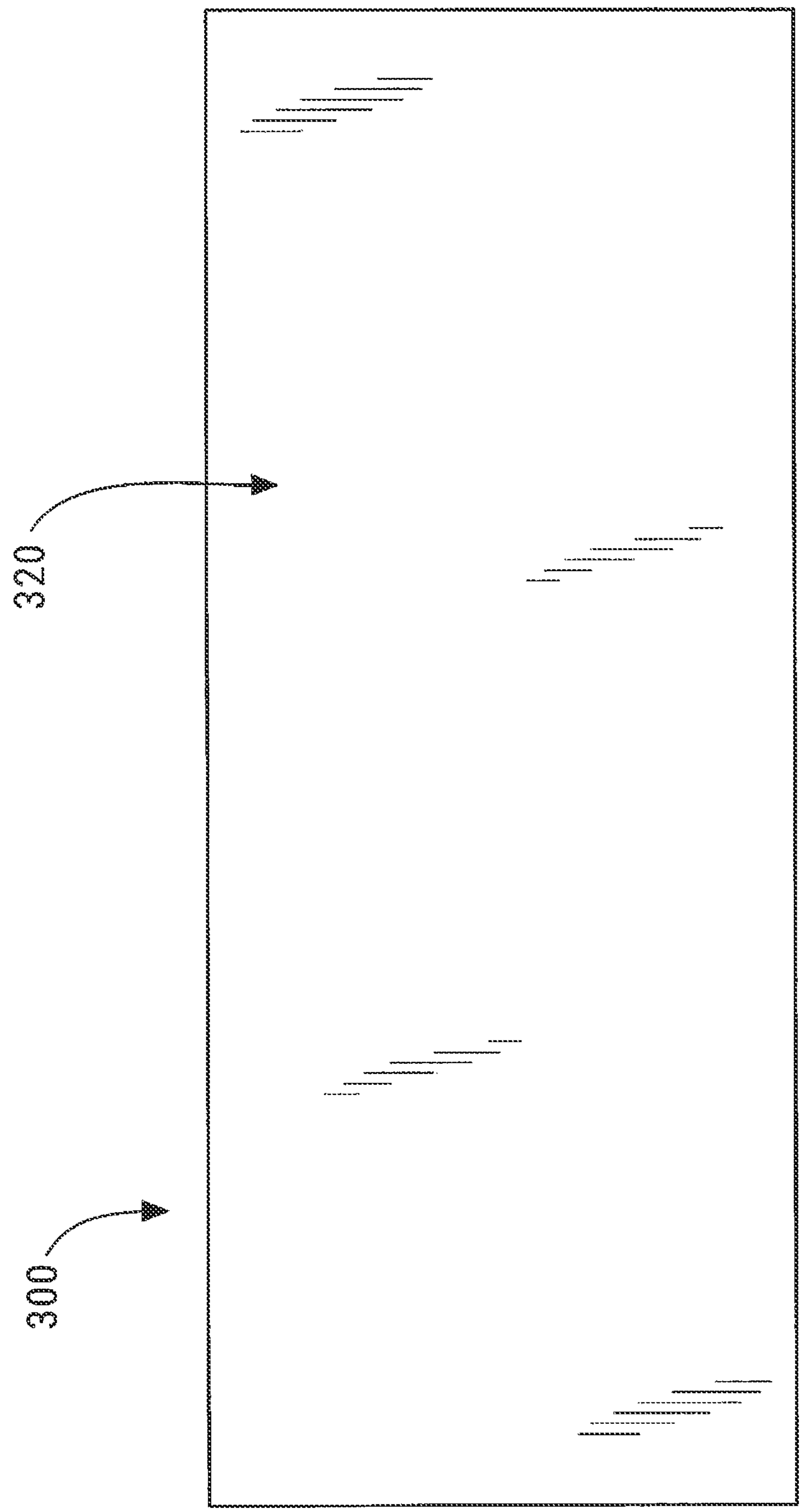
FIG. 19 is a bottom view of the jig of FIG. 13.
Figure 20:
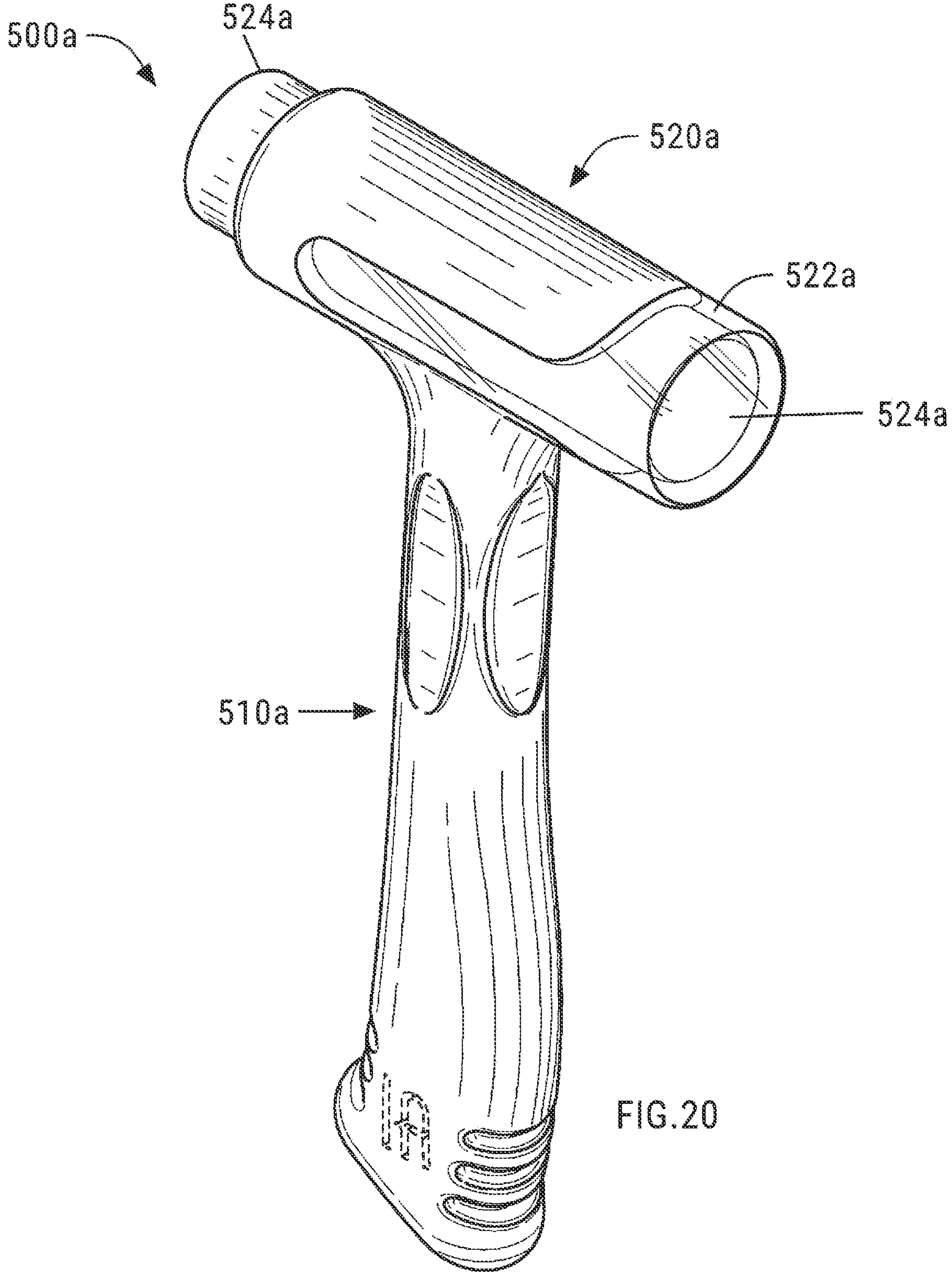
FIG. 20 is a left, front, perspective view of a first hammer of the stamping kit of FIGS. 1-4.
Figure 21:
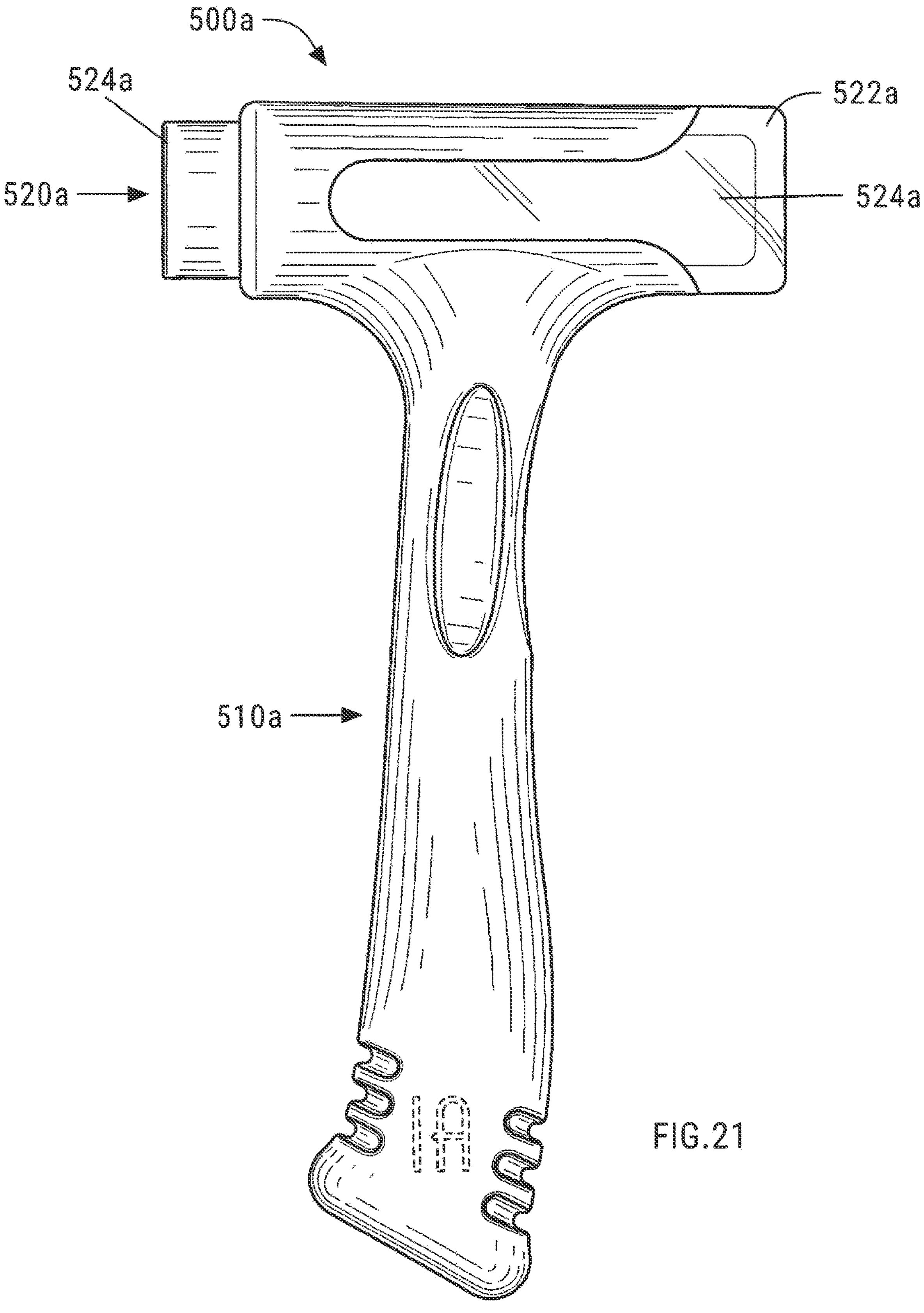
FIG. 21 is a left side view of the first hammer of FIG. 20.
Figure 22:
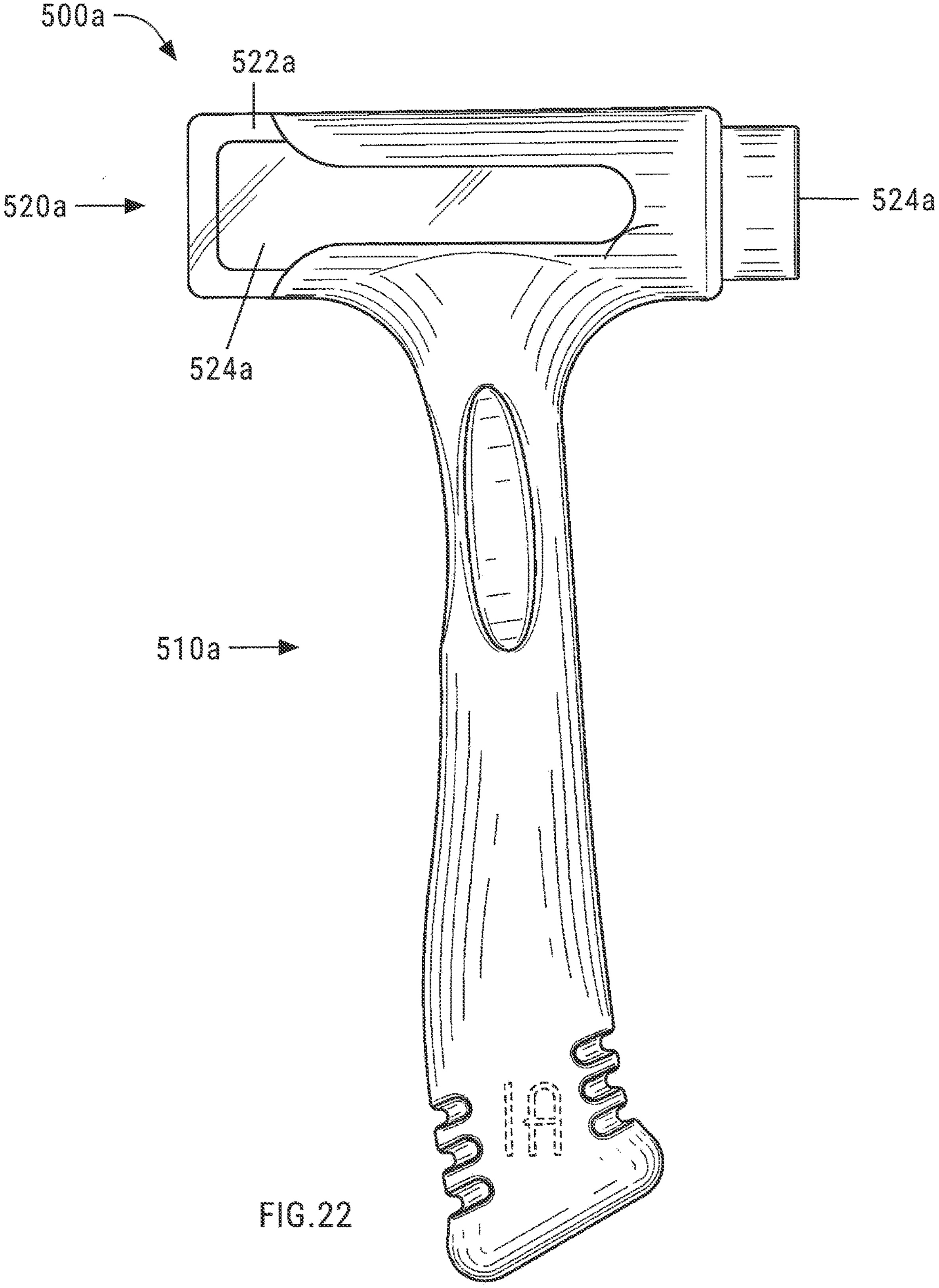
FIG. 22 is a right side view of the first hammer of FIG. 20.
Figure 23:
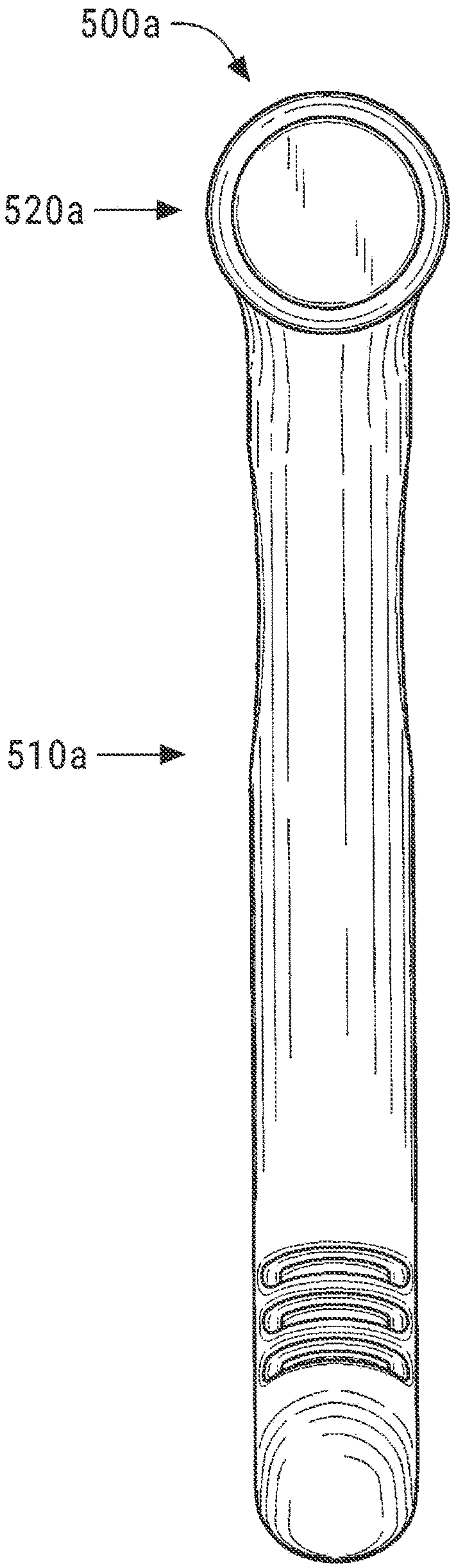
FIG. 23 is a rear view of the first hammer of FIG. 20.
Figure 24:
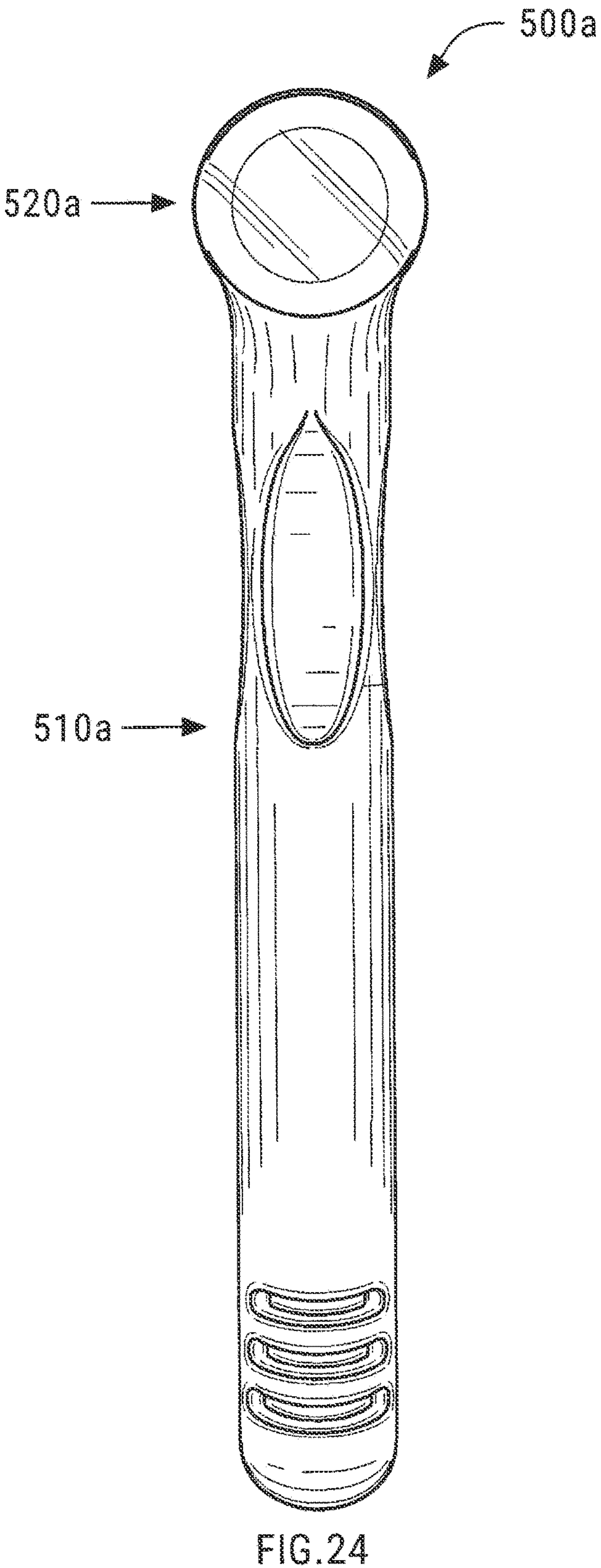
FIG. 24 is a front view of the first hammer of FIG. 20.
Figure 25:
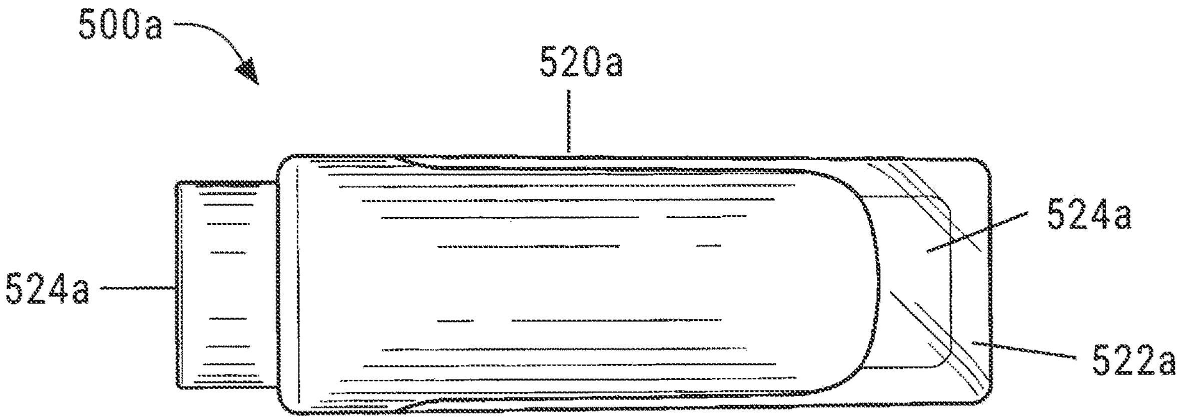
FIG. 25 is a top view of the first hammer of FIG. 20.
Figure 26:
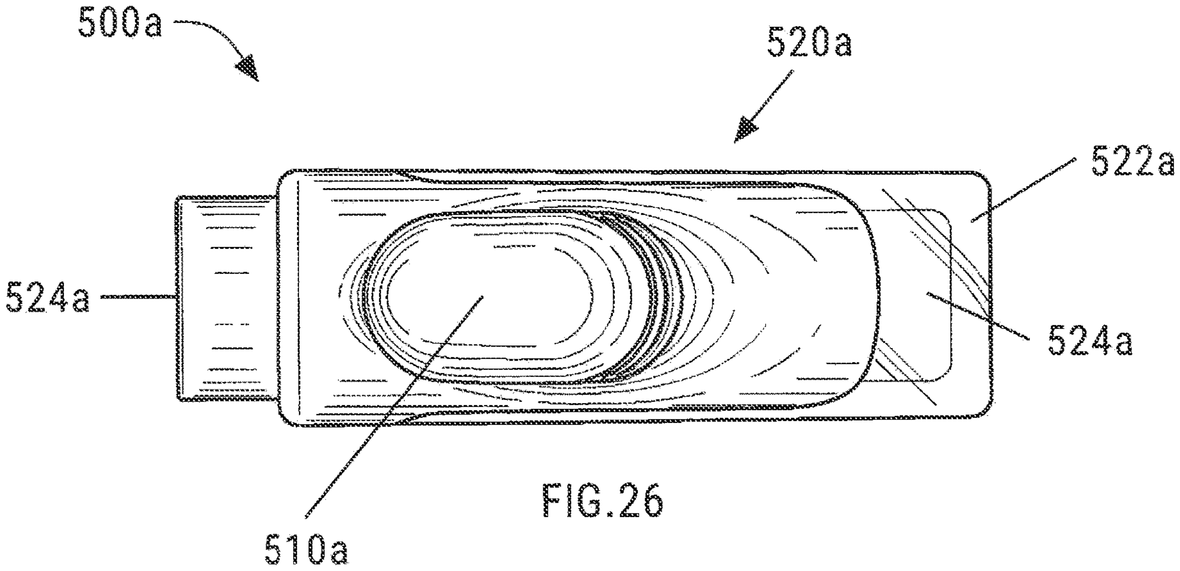
FIG. 26 is a bottom view of the first hammer of FIG. 20.
Figure 27:
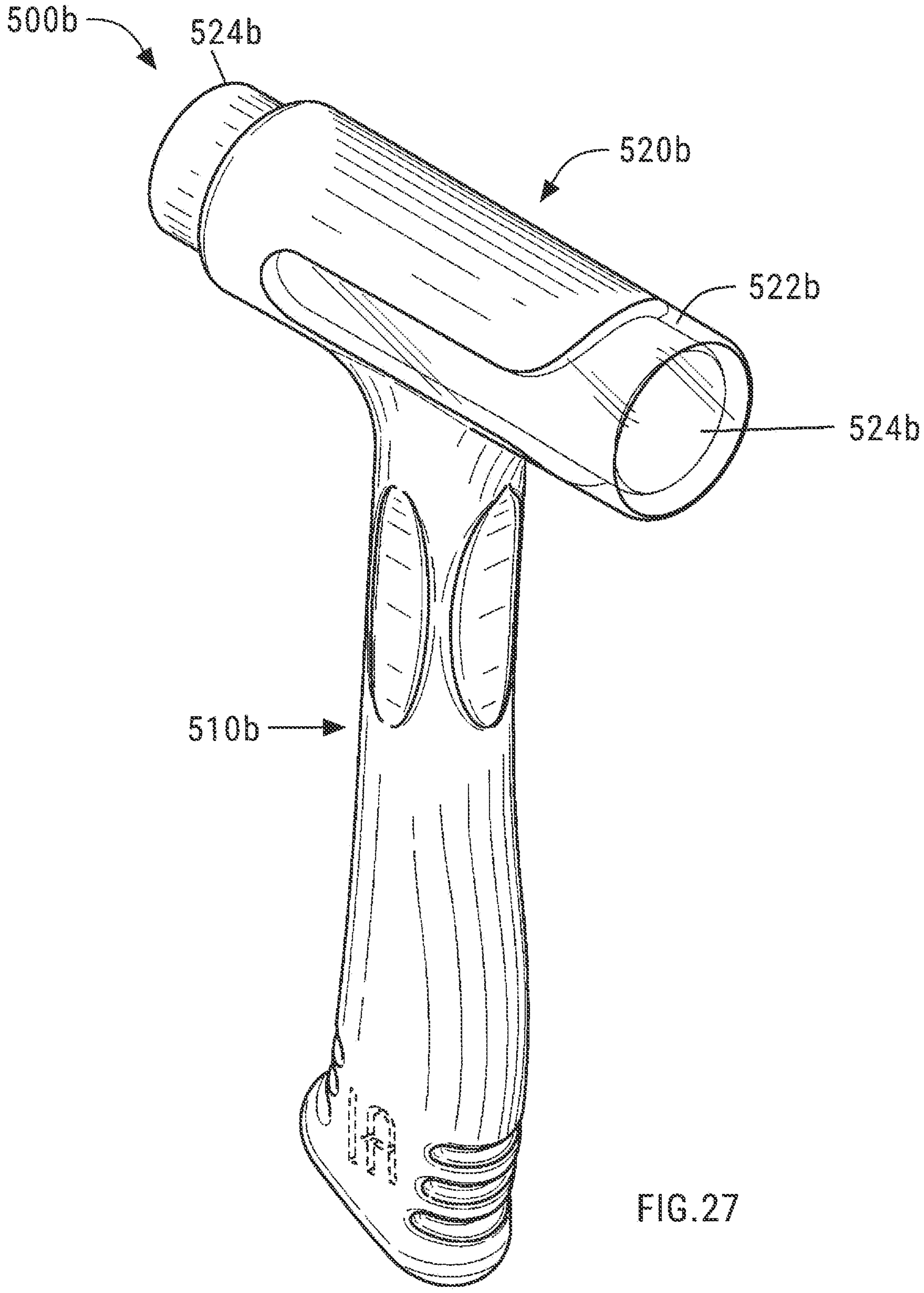
FIG. 27 is a left, front, perspective view of a second hammer of the stamping kit of FIGS. 1-4.
Figure 28:
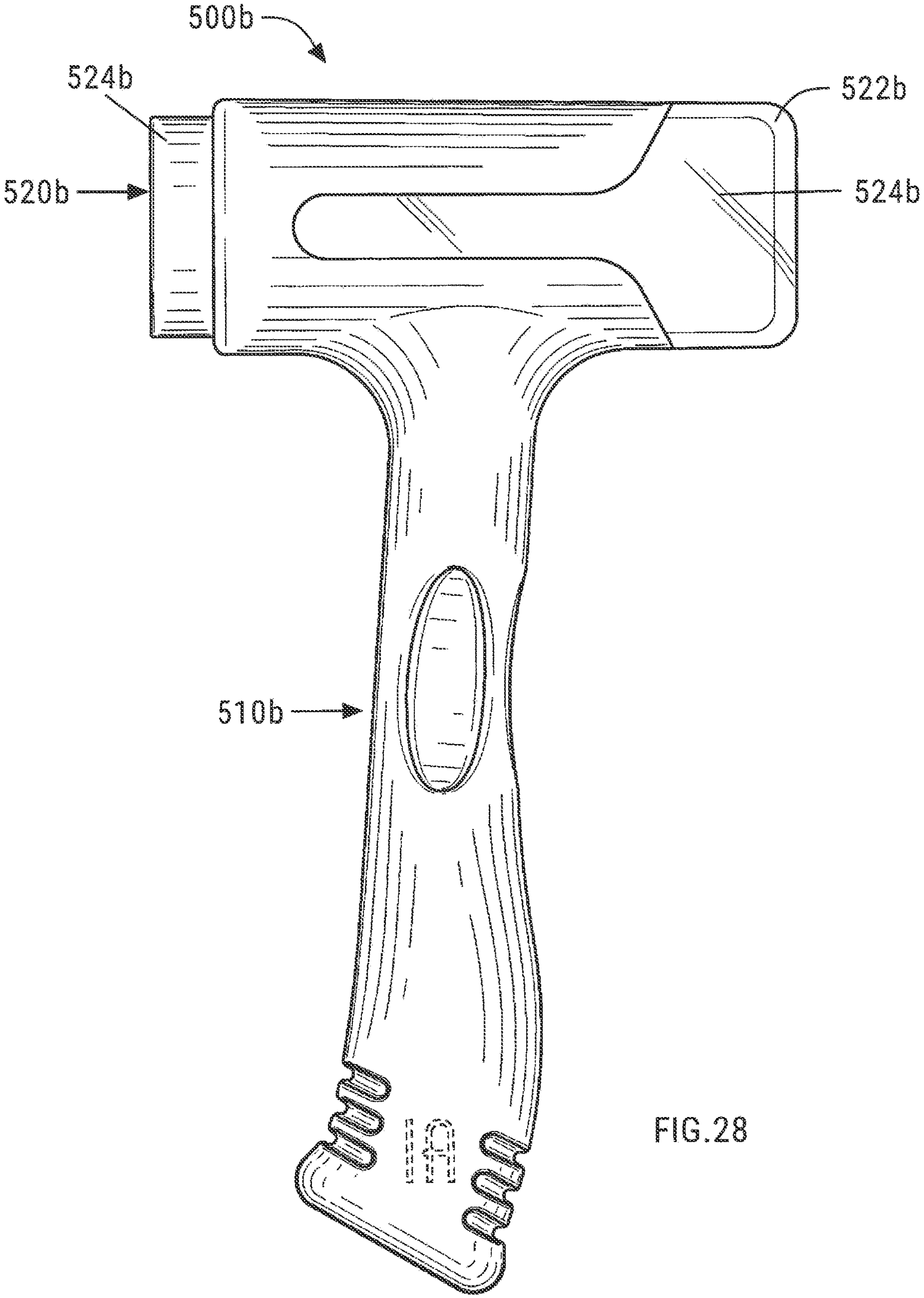
FIG. 28 is a left side view of the second hammer of FIG. 27.
Figure 29:
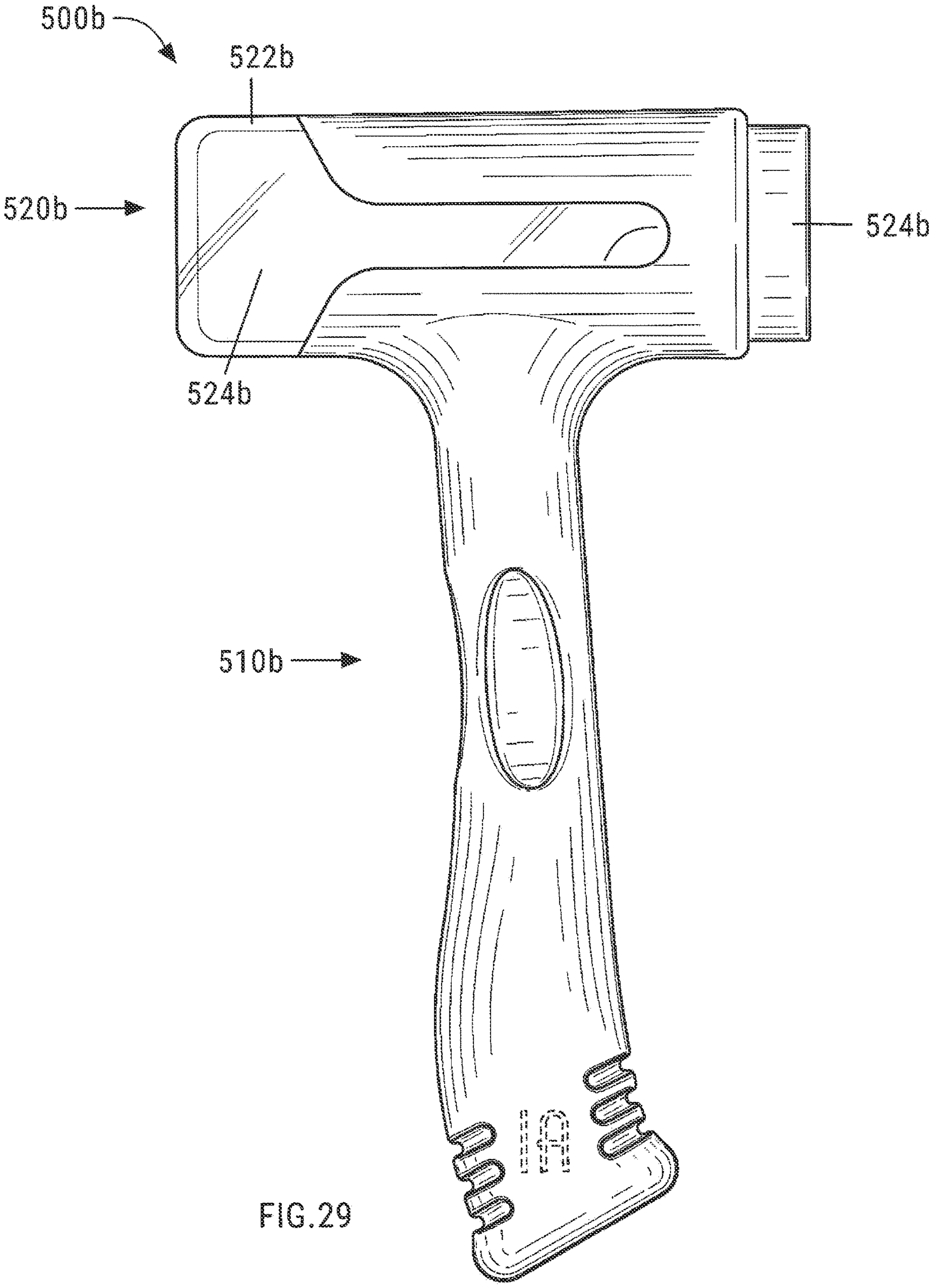
FIG. 29 is a right side view of the second hammer of FIG. 27.
Figure 30:
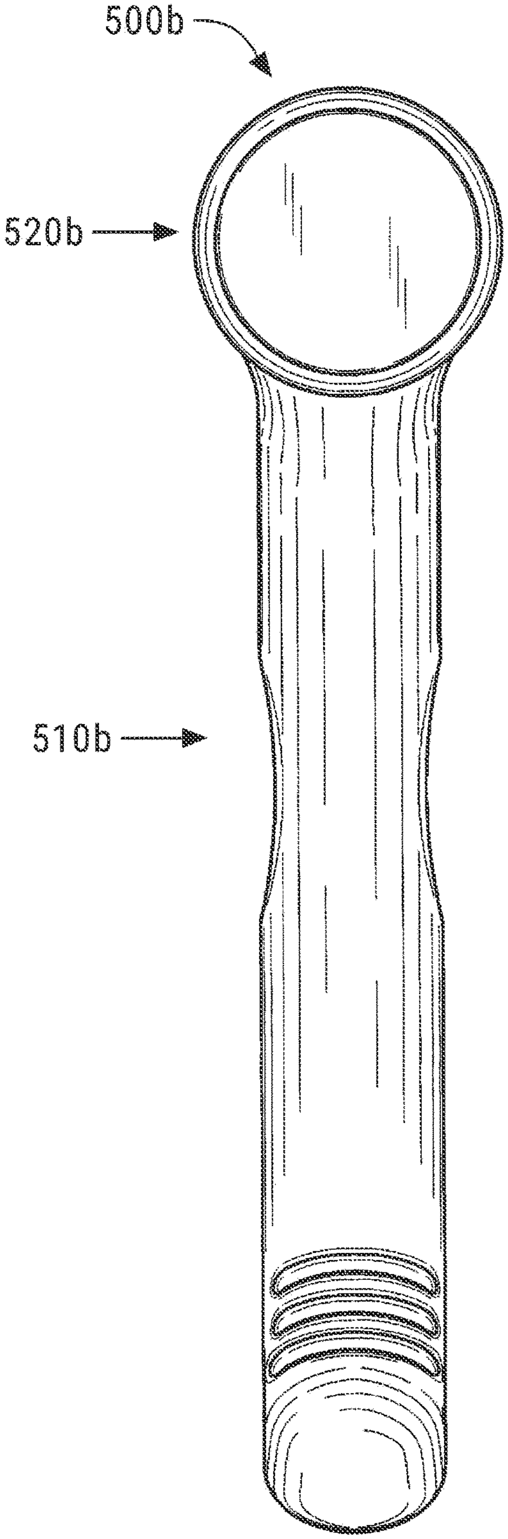
FIG. 30 is a rear view of the second hammer of FIG. 27.
Figure 31:
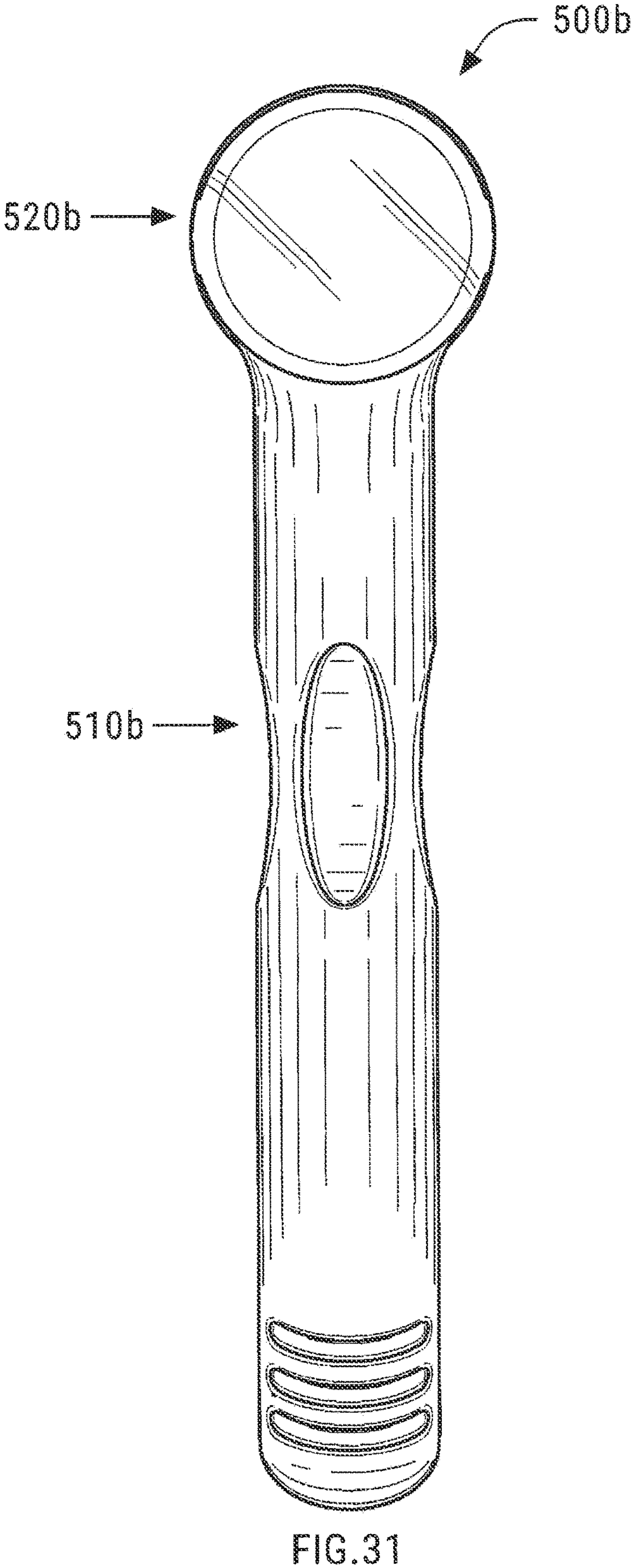
FIG. 31 is a front view of the second hammer of FIG. 27.
Figure 32:
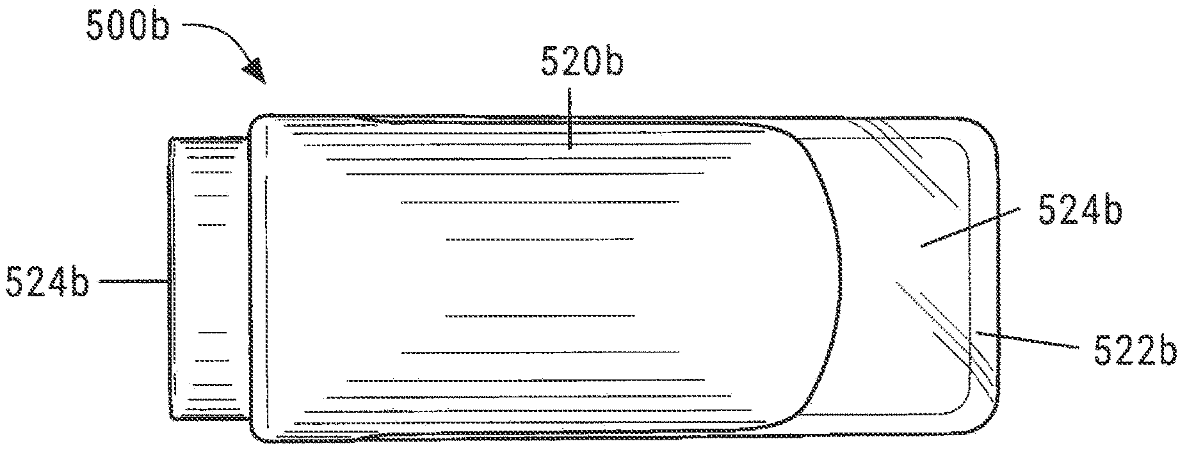
FIG. 32 is a top view of the second hammer of FIG. 27.
Figure 33:
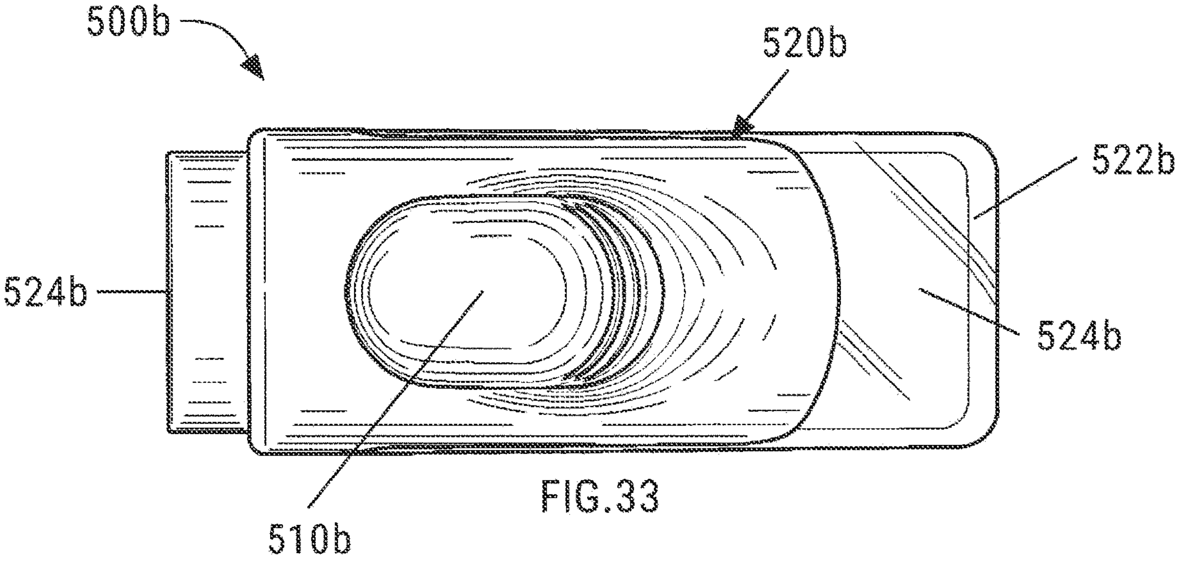
FIG. 33 is a bottom view of the second hammer of FIG. 27.
Figure 34:
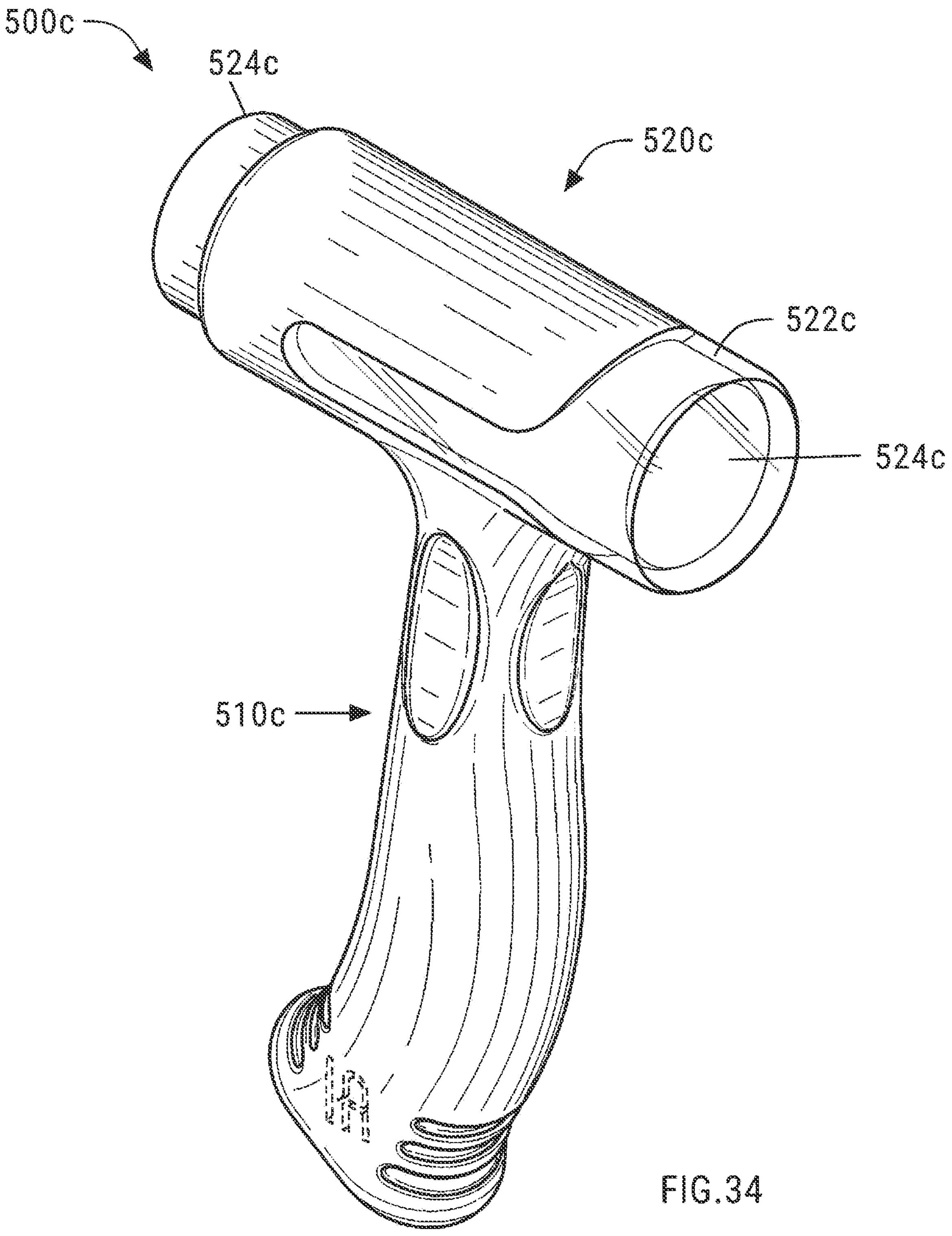
FIG. 34 is a left, front, perspective view of a third hammer of the stamping kit of FIGS. 1-4.
Figure 35:
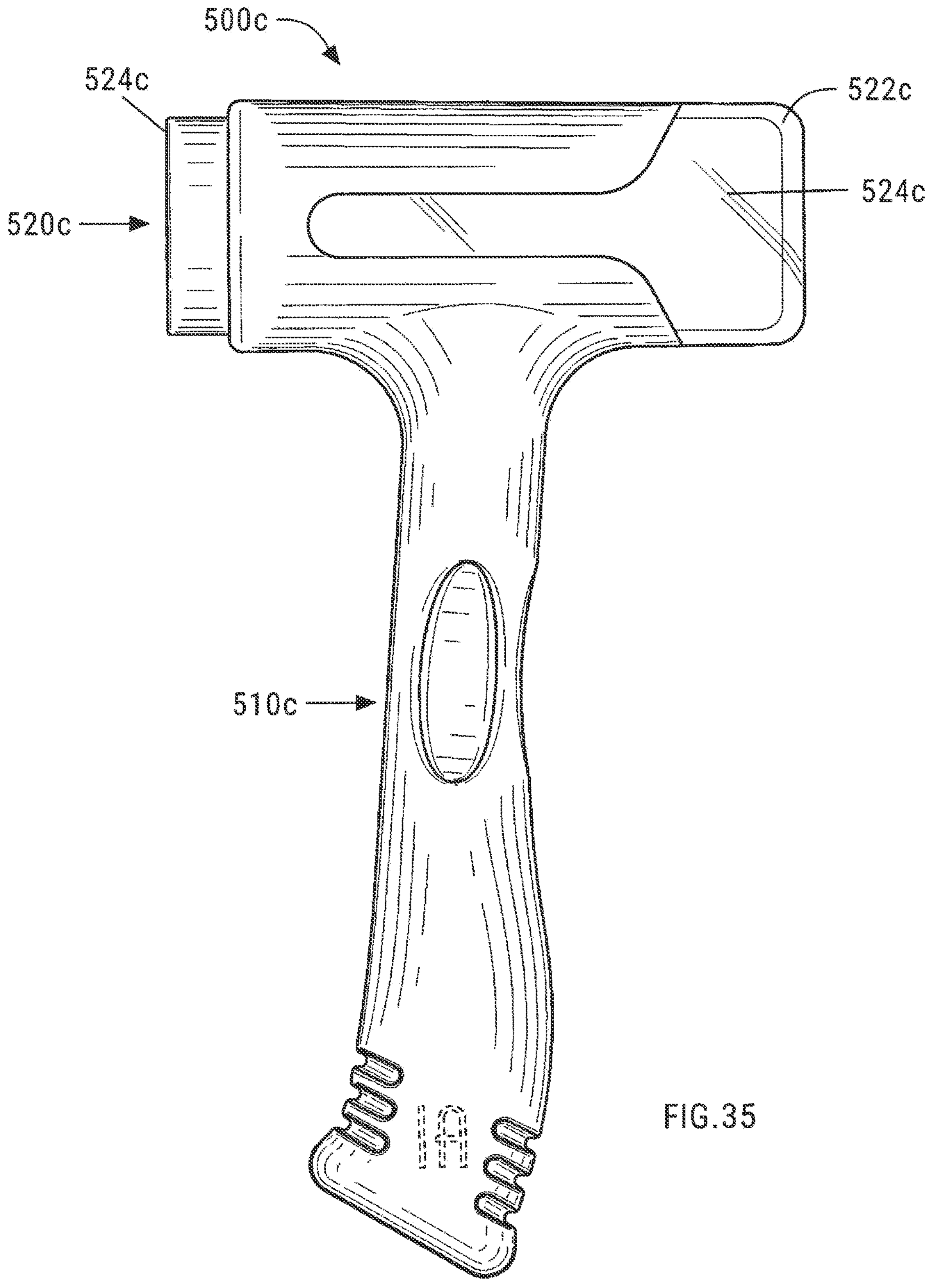
FIG. 35 is a left side view of the third hammer of FIG. 34.
Figure 36:
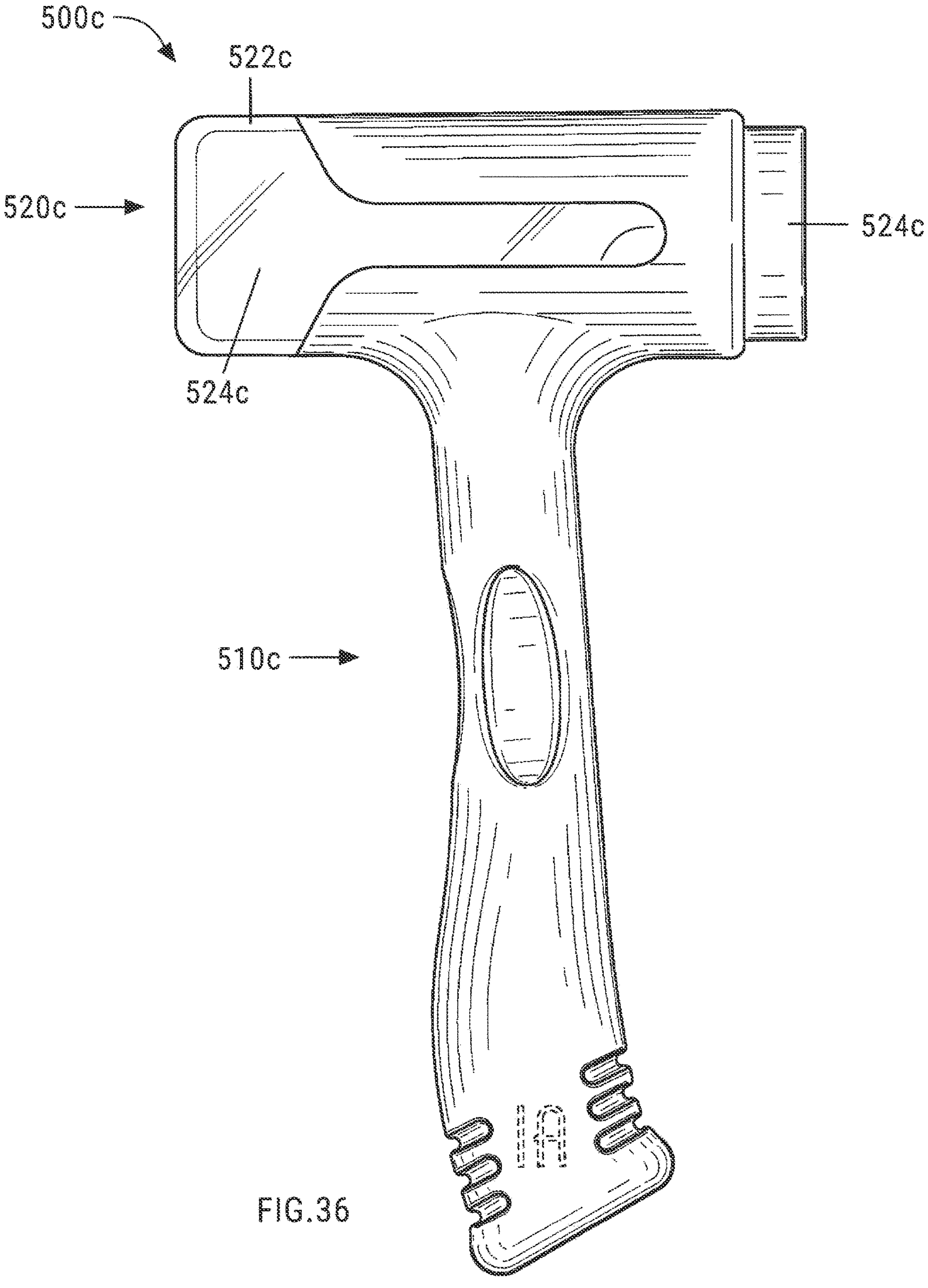
FIG. 36 is a right side view of the third hammer of FIG. 34.
Figure 37:
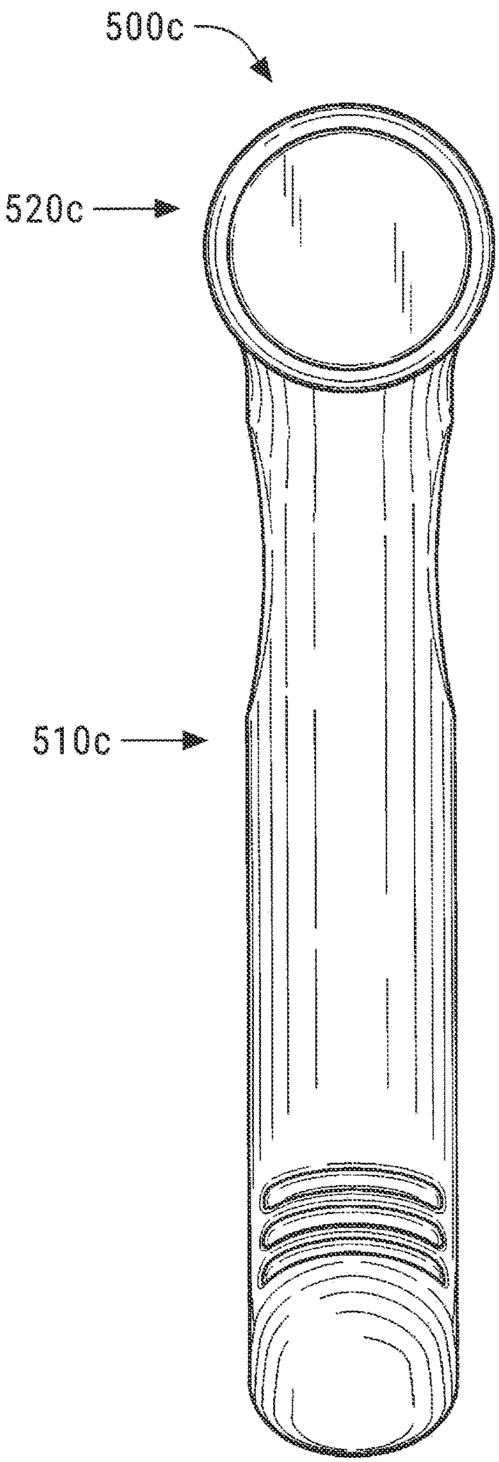
FIG. 37 is a rear view of the third hammer of FIG. 34.
Figure 38:
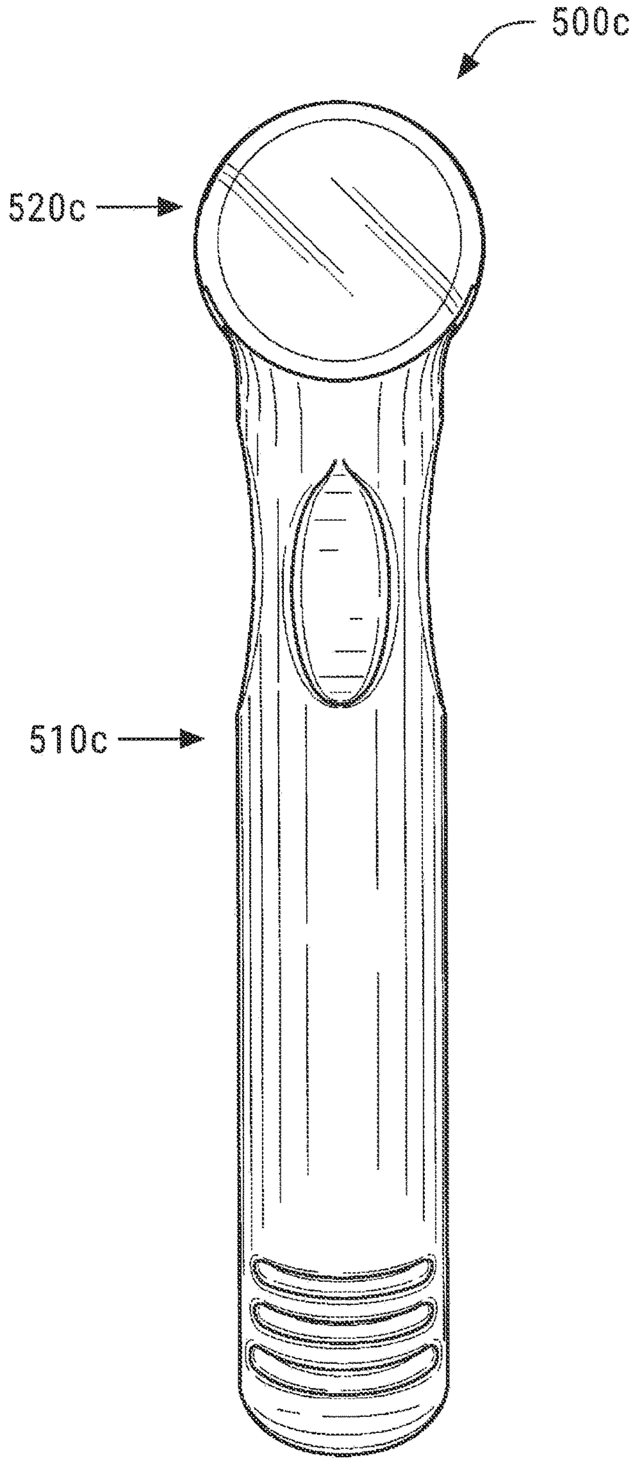
FIG. 38 is a front view of the third hammer of FIG. 34.
Figure 39:
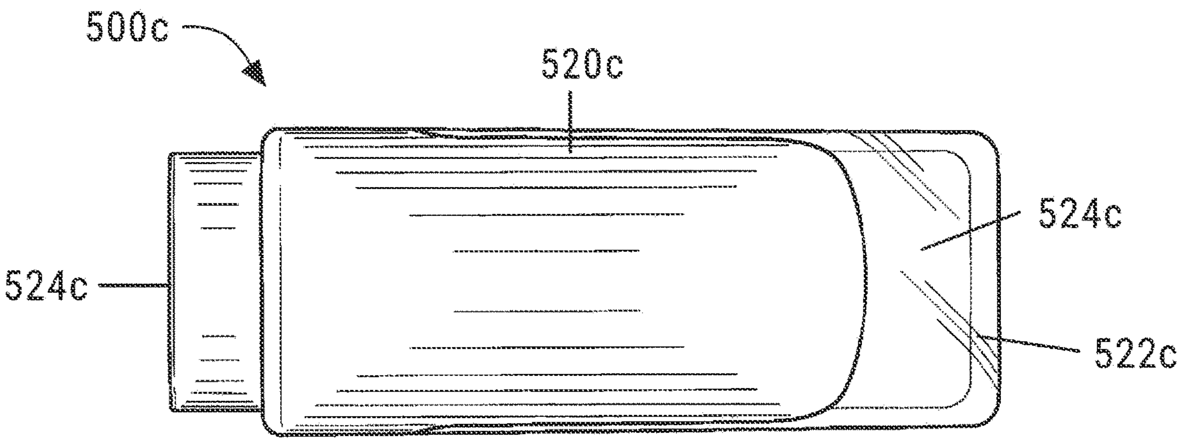
FIG. 39 is a top view of the third hammer of FIG. 34.
Figure 40:
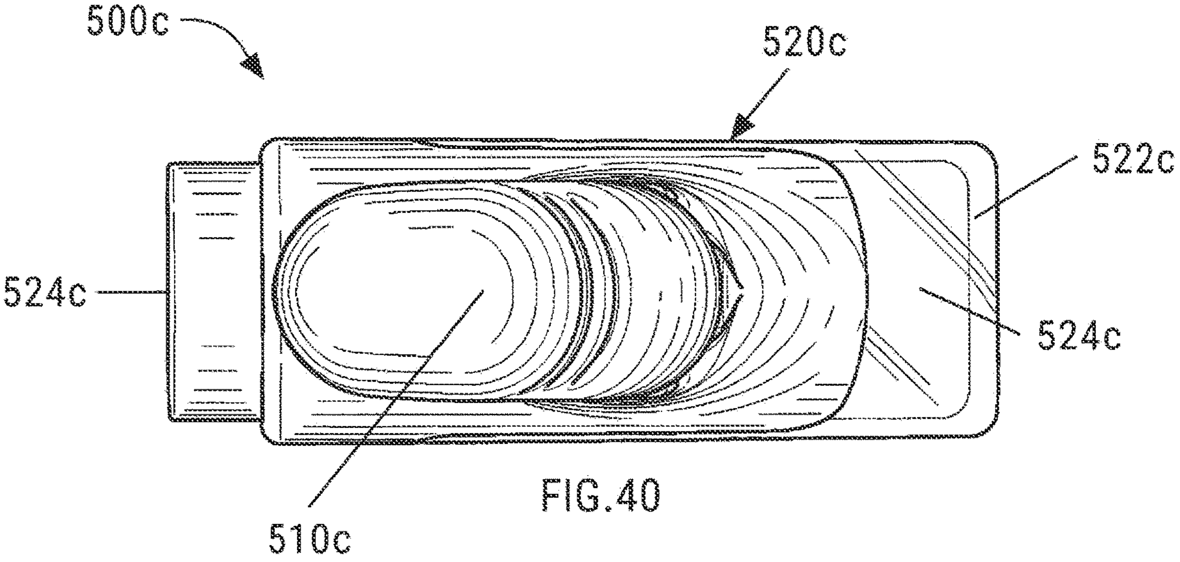
FIG. 40 is a bottom view of the third hammer of FIG. 34.

Additionally, the illustrated embodiment shows a particular spacing of the alignment marks 370 of the jig 300. In each set of alignment marks 370, adjacent alignment marks 370 are spaced a first distance "d1" apart from each other (FIG. 18). In embodiments, the first distance "d1" is equal to or approximately equal to half of a width "sw" of the stamp 400. That is, the width "sw" of the stamp 400 is equal to or approximately equal to the distance between a first alignment mark 370*a* and a third alignment mark 370*c*, for instance (FIG. 18). In embodiments, the first distance "d1" is between about 0.075 inches and about 0.135 inches (e.g., equal to about 0.11 inches). This spacing of adjacent alignment marks 370 (and thereby the spacing of characters on the card 200) help ensure that a certain maximum number of characters (e.g., eight characters) are able to legibly fit on each enumerated line 210 of the card 200.

Figure 13:
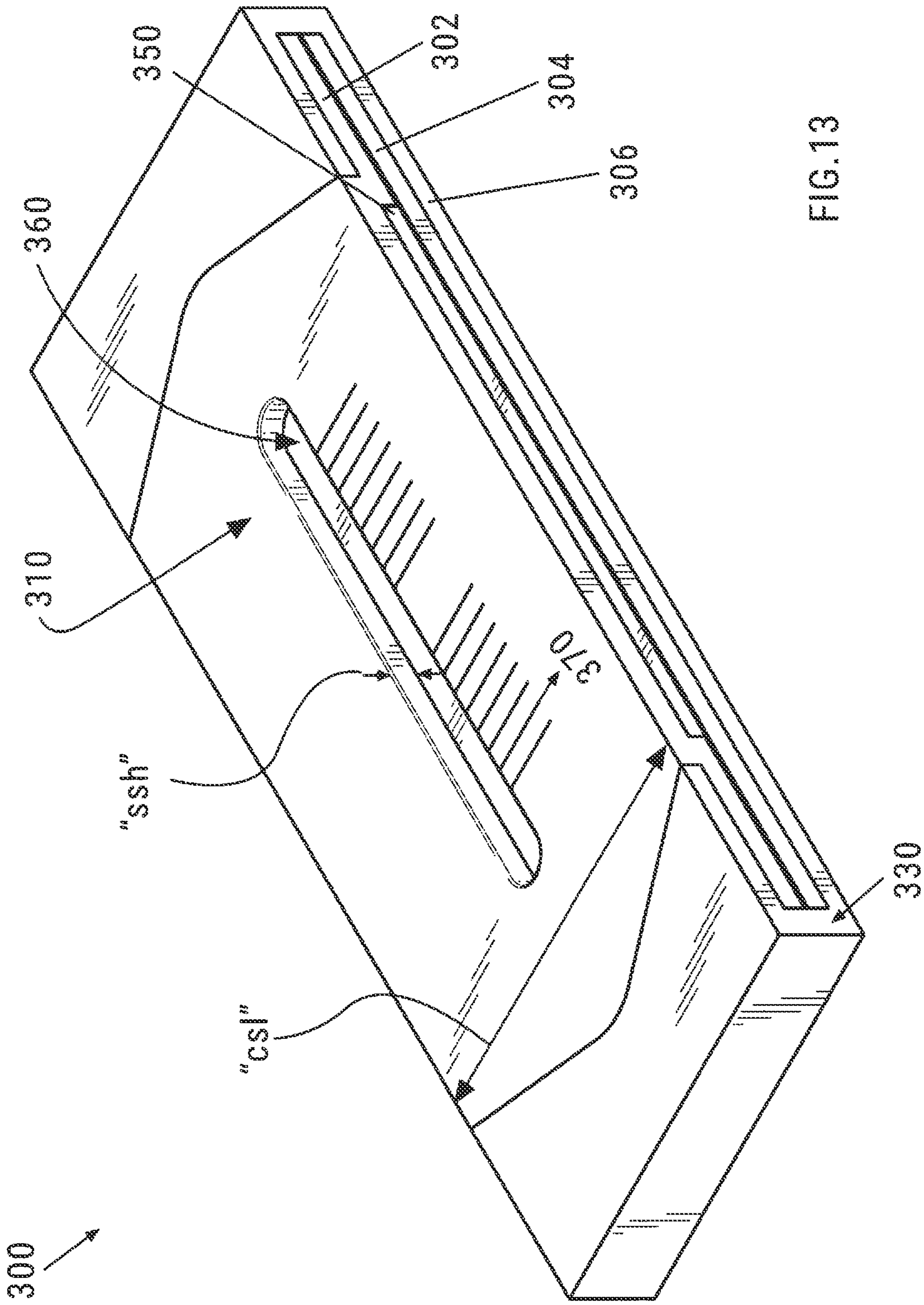
FIG. 13 is a perspective view of an embodiment of a jig of the stamping kit of FIGS. 1-4.
Figure 14:
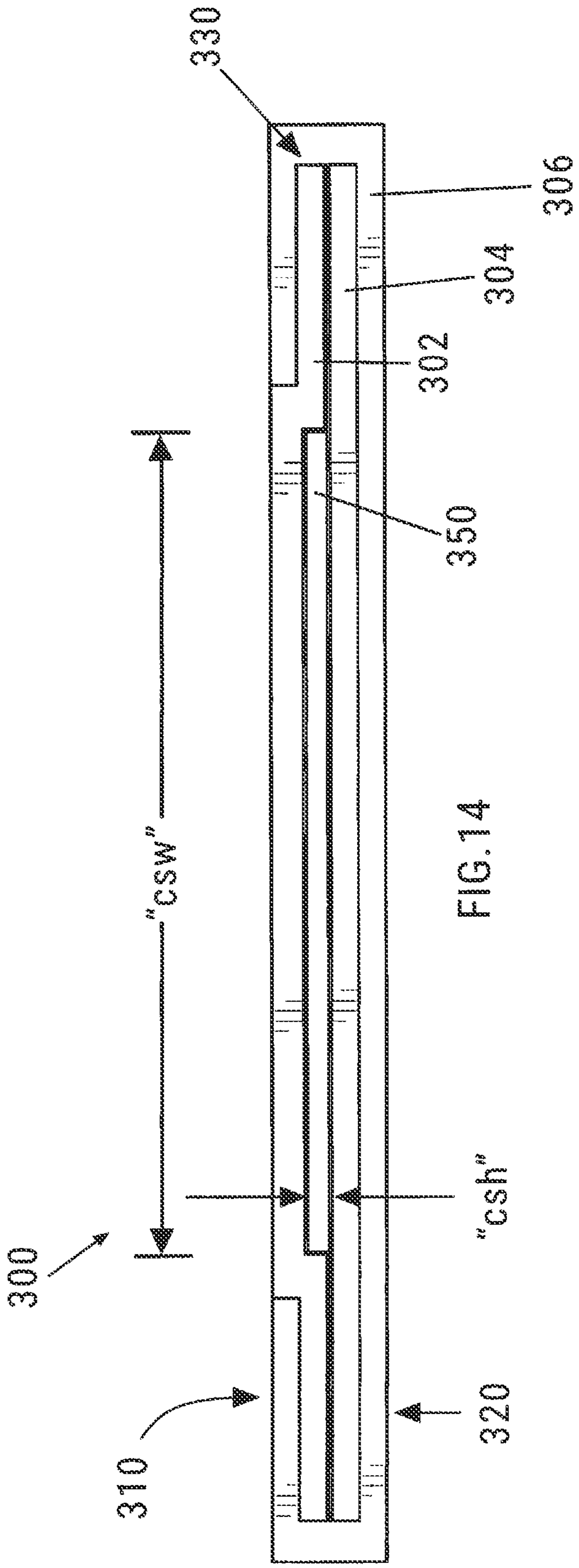
FIG. 14 is a front view of the jig of FIG. 13.
Figure 15:
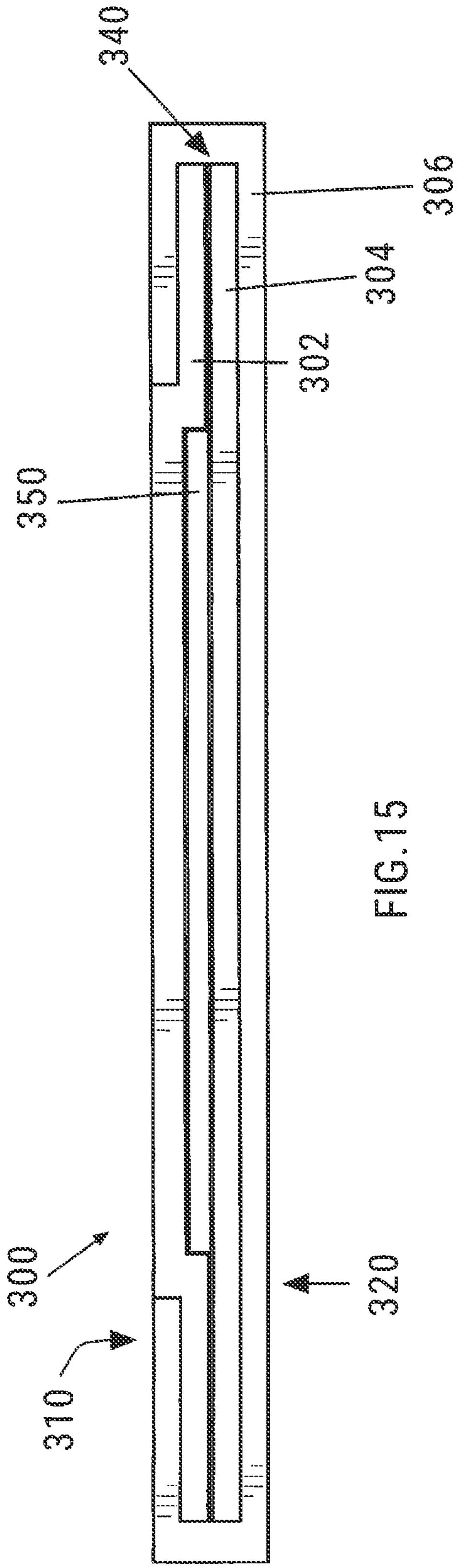
FIG. 15 is a rear view of the jig of FIG. 13.
Figure 17:
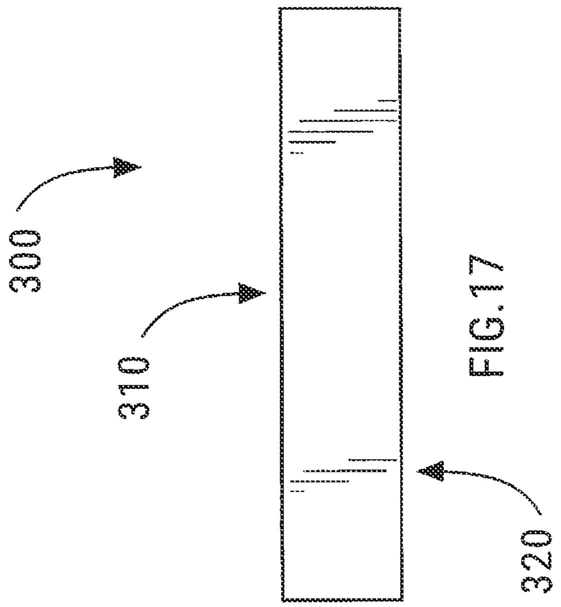
FIG. 17 is a left side view of the jig of FIG. 13.
Figure 16:
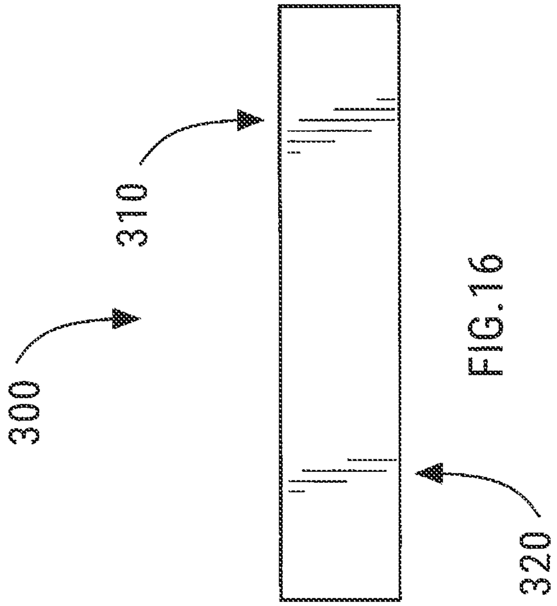
FIG. 16 is a right side view of the jig of FIG. 13.

With particular reference to FIGS. 13-15, various layers of the jig 300 are shown. (The layers of the jig 300 in FIGS. 1-4 are omitted for clarity.) In the illustrated embodiment, the jig 300 includes a first layer 302, a second layer 304, and a third layer 306. In embodiments, the first layer 302, which includes the alignment marks 370, is made from plastic (e.g., ABS or Acrylonitrile butadiene styrene, which is a thermoplastic polymer). The first layer 302 may be transparent, translucent, or opaque. In embodiments, the second layer 304 is made from steel, and the third layer 306 is made from rubber (e.g., a thermoplastic polymer or a thermoplastic rubber).

As shown in the illustrated embodiment, the rubber may be injection molded through a portion of the first layer 302 and through a portion of the second layer 304, which are both suitable to accommodate such injection molding. Such as injection molding process helps maintain the three layers 302, 304, 306 in place relative to each other during the stamping process. The third layer 306 being made from rubber also helps increase friction between the jib 300 and the surface on which it lays, which minimizes movement therebetween during the stamping process, thereby resulting in more accurate, deeper, and more even impressions on the card 200. Additionally, the rubber of the third layer 306 helps to dampen the noise created during the stamping process.

With reference to FIGS. 20-26, the first hammer 500*a* is shown. While various elements of the first hammer 500*a* are shown as a single unit, the present disclosure is intended to encompass various features of the first hammer 500*a*, individually in addition to as a whole. For instance, a handle 510*a* of the first hammer 500*a*, and portions thereof, are encompassed by the present disclosure. Additionally, a hammer head 520*a* of the first hammer 500*a*, and portions thereof, are encompassed by the present disclosure. For instance, the hammer head 520*a* includes a transparent or translucent portion 522*a*, which enables a slug 524*a* therein to be visible. In the illustrated embodiment, the slug 524*a* also extends beyond the transparent or translucent portion 522*a*. In embodiments, the first hammer 500*a* weighs 4 oz or approximately 4 oz.

With reference to FIGS. 27-33, the second hammer 500*b* is shown. While various elements of the second hammer 500*b* are shown as a single unit, the present disclosure is intended to encompass various features of the second hammer 500*b*, individually in addition to as a whole. For instance, a handle 510*b* of the second hammer 500*b*, and portions thereof, are encompassed by the present disclosure. Additionally, a hammer head 520*b* of the second hammer 500*b*, and portions thereof, are encompassed by the present disclosure. For instance, the hammer head 520*b* includes a transparent or translucent portion 522*b*, which enables a slug 524*b* therein to be visible. In the illustrated embodiment, the slug 524*b* also extends beyond the transparent or translucent portion 522*b*. In embodiments, the second hammer 500*b* weighs 1 lb. or approximately 1 lb.

With reference to FIGS. 34-40, the third hammer 500*c* is shown. While various elements of the third hammer 500*c* are shown as a single unit, the present disclosure is intended to encompass various features of the third hammer 500*c*, individually in addition to as a whole. For instance, a handle 510*c* of the third hammer 500*c*, and portions thereof, are encompassed by the present disclosure. Additionally, a hammer head 520*c* of the third hammer 500*c*, and portions thereof, are encompassed by the present disclosure. For instance, the hammer head 520*c* includes a transparent or translucent portion 522*c*, which enables a slug 524*c* therein to be visible. In the illustrated embodiment, the slug 524*c* also extends beyond the transparent or translucent portion 522*c*. In embodiments, the third hammer 500*c* weighs 2 lb. or approximately 2 lb.

Figure 41:
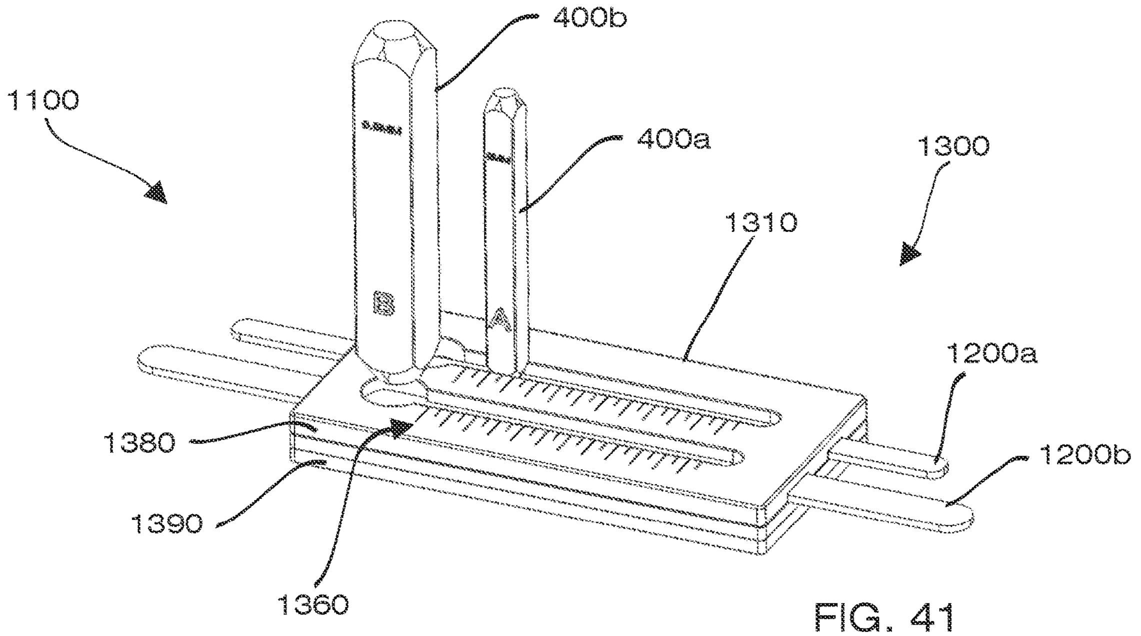
FIG. 41 is a perspective view of multiple components of another stamping kit in accordance with an embodiment of the present disclosure.
Figure 42:
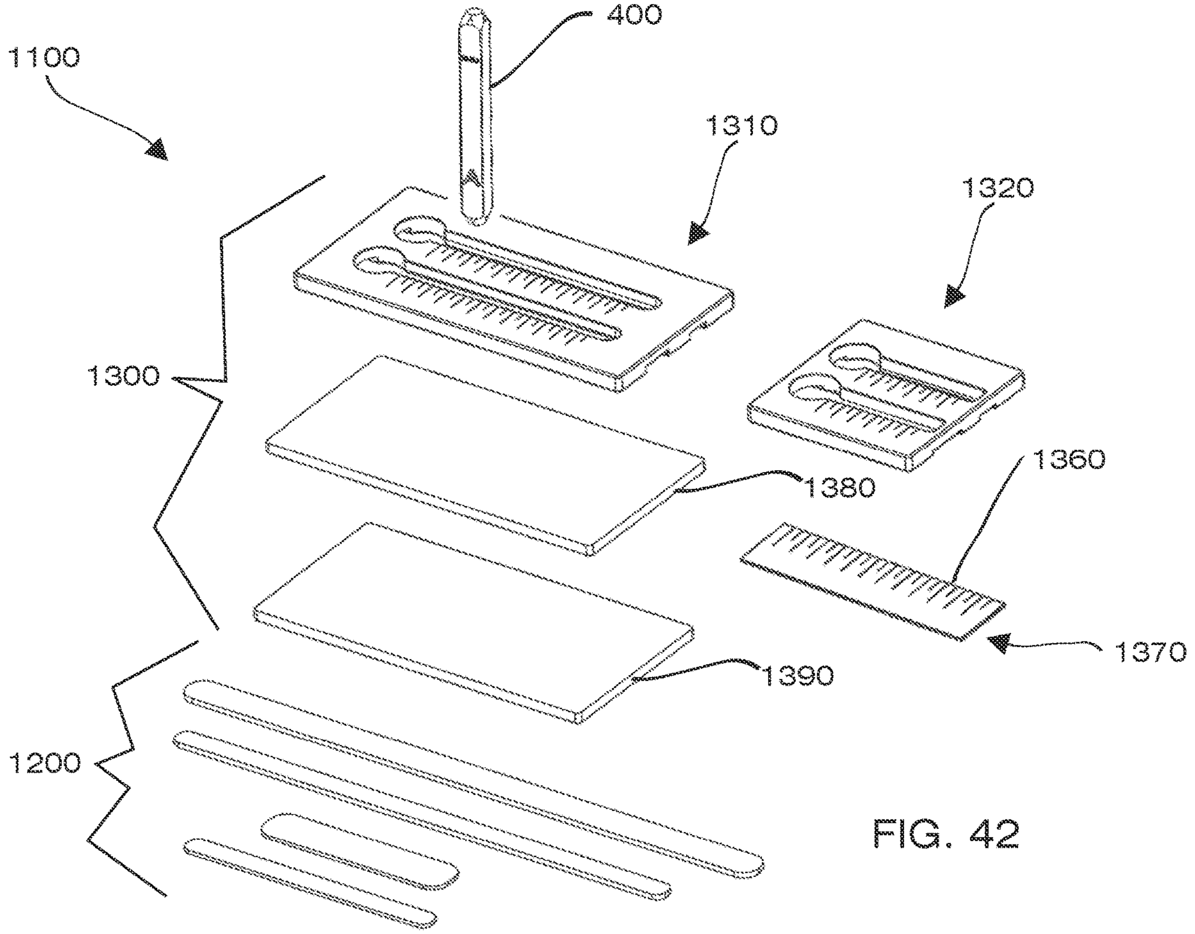
FIG. 42 is a perspective view, with parts detached, of multiple components of the stamping kit of FIG. 41.

Referring now to FIGS. 41-50, an embodiment of a stamping kit is illustrated and is generally referenced by number 1100. The stamping kit 1000 includes any or all of the following: at least one blank (while multiple blanks are shown, for clarity, the blanks are collectively referred to as "blank 1200," unless otherwise specified), at least one jig assembly 1300 (or portions thereof), a plurality stamps (FIGS. 1-5, 41, 42, and 46-50 (two stamps are shown in FIGS. 5 and 41; for clarity, a single stamp is referred to as "stamp 400"); and a hammer 500 (FIGS. 20-40). While various differences and similarities of the stamping kit 1100 and the stamping kit 100 are described herein, various features and uses of the stamping kit 1100 are usable in connection with the stamping kit 100, and various features and uses of the stamping kit 100 are usable in connection with the stamping kit 1100.

As discussed in further detail below, the stamping kit 1100 is usable to imprint characters onto at least one blank 1200. The imprinted blank 1200 can then be shaped into a circular configuration and used as a bracelet, ring, etc.

Generally, an embodiment of the jig assembly 1300 (shown in FIG. 41, for example) includes a jig or first jig 1310, a plurality of alignment marks 1360, a first plate 1380, and a second plate 1390. Additionally, a second jig 1320 (FIG. 42) and a third jig 1325 (FIG. 50) are also disclosed. The jig assembly 1300 includes the first jig 1310 and/or the second jig 1320 and/or the third jig 1325. While the first jig 1310 is larger in length than the second jig 1320 and the third jig 1325, other features of the first jig 1310, the second jig 1320 and the third jig 1325 are the same or similar. Various features and differences of the first jig 1310, the second jig 1320 and the third jig 1325 are discussed herein. To the extent that the second jig 1320 and/or the third jig 1325 have the same or similar features as the first jig 1310, some of those features are omitted for clarity and brevity.

Figure 43:
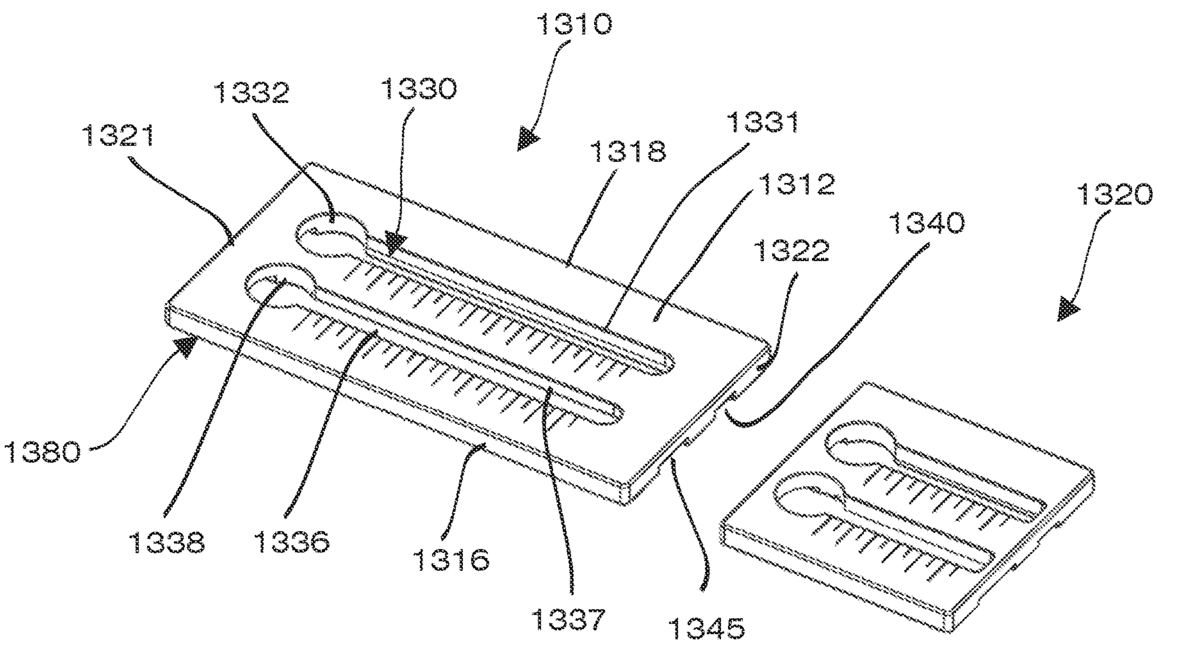
FIG. 43 is a perspective view of a first jig and a second jig of the stamping kit of FIG. 41.

In the illustrated embodiment, and with particular reference to FIG. 43, the jig 1310 includes an upper surface 1312, a lower surface 1314, a front surface 1316, a rear surface 1318, a first side surface 1321, a second side surface 1322, a first stamping slot 1330, a second stamping slot 1336, a first card slot 1340, and a second card slot 1345. The first stamping slot 1330 and the second stamping slot 1336 each extend from the upper surface 1312 to the first card slot 1340 and the second card slot 1345, respectively.

Additionally, while the figures do not show all sides of the various features of the stamping kit 1100, the hidden sides are mirror images of the sides that are shown, where applicable. For instance, the rear surface 1318 of the jig 1310 is a mirror image of the front surface 1316 of the jig 1310; and the first side surface 1321 of the jig 1310 is a minor image of the second side surface 1322 of the jig 1310.

The first stamping slot 1330 and the second stamping slot 1336 are each configured to removably accept a portion of the stamp 400 therein (see FIG. 41, for example). Additionally, each of the first stamping slot 1330 and the second stamping slot 1336 define a keyhole shape, wherein a first portion 1331, 1337 of the respective first stamping slot 1330 and second stamping slot 1336 is configured to accommodate a first sized stamp 400*a* (FIG. 41), and a second portion 1332, 1338 of the respective first stamping slot 1330 and second stamping slot 1336 is configured to accommodate a second, larger sized stamp 400*b* (FIG. 41). The ability of the jig 1310 to accept different sized stamps 400*a*, 400*b* enables a single jig 1310 to be used to accurately stamp the same blank 1200, for example, with different sized characters.

While the illustrated embodiments show the jig 1310 including two stamping slots, it is also envisioned that the jig 1310 includes more or fewer than two stamping slots.

The first card slot 1340 and the second card slot 1345 are each configured to removably accept a blank 1200 (see FIG.

41, for example). Additionally, in the illustrated embodiment, the width (in the direction from the front surface 1316 of the jig 1310 toward the rear surface 1318 of the jig 1310) of the first card slot 1340 is different (e.g., smaller) than the width of the second card slot 1345, thus facilitating and/or enabling the positioning of different-width blanks 1200 thereon or therethrough. That is, in FIG. 41 a first blank 1200*a* is positioned in the first card slot 1340, and a second blank 1200*b* is positioned in the second card slot 1345; the first blank 1200*a* is narrower than the second blank 1200*b*.

Figure 50:
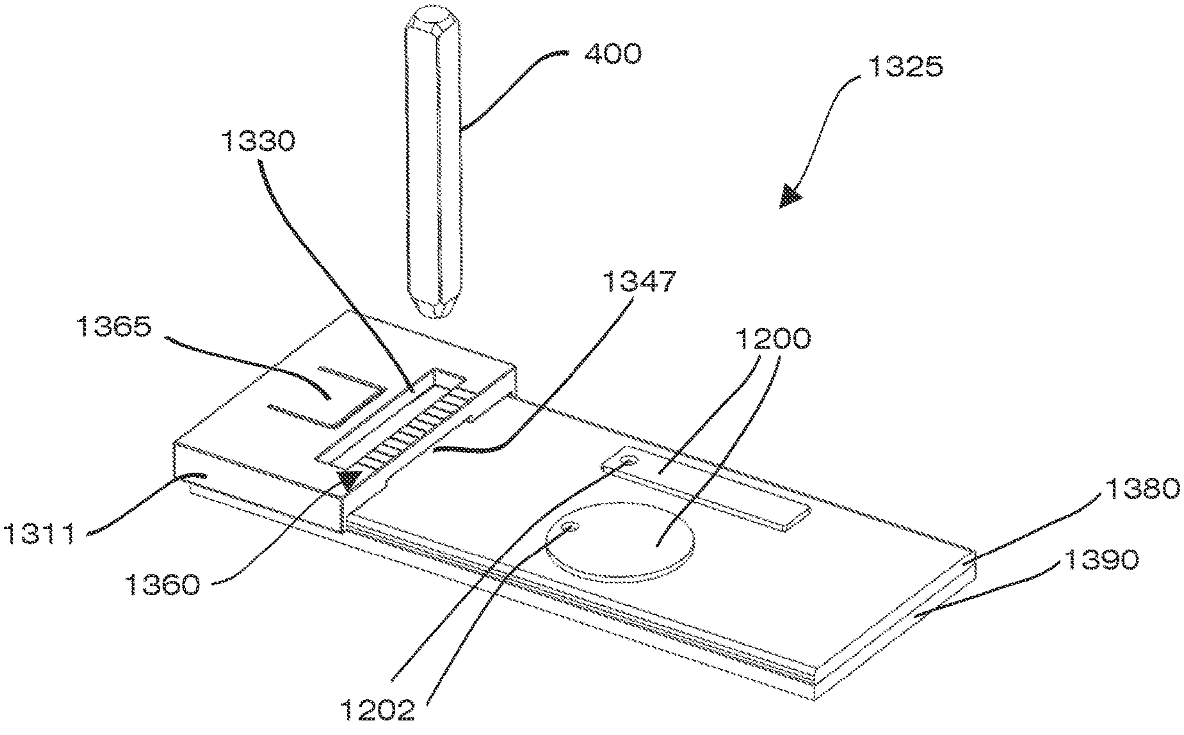
FIG. 50 is a perspective view of multiple components of another stamping kit in accordance with an embodiment of the present disclosure.

While the illustrated embodiments show the jig 1310 including two card slots, it is also envisioned that the jig 1310 includes more or fewer than two card slots, including zero card slots (see FIG. 50, for instance, which illustrates the third jig 1325). In the embodiment shown in FIG. 50, the jig 1325 is positionable over a blank 1200. The blank 1200 may be positioned on the first plate 1380, as shown, or the blank 1200 may be positioned on another surface, such as a table, for instance. Further, in this embodiment, the jig 1325 may include at least one side wall 1311 (e.g., three side walls) which can facilitate placing and/or maintaining the jig 1310 in a desired position relative to the blank 1200, for example.

With continued reference to FIG. 50, the third jig 1325 also defines a card slot 1347, and includes a living hinge 1365. The card slot 1347 enables insertion of a blank 1200 between the first plate 1380 and the stamping slot 1330 of the jig 1325. The living hinge 1365 is movable toward the first plate 1380 into engagement with the blank 1200 when then blank 1200 is in position for stamping. Further, the living hinge 1365 may include a nub (e.g., a defining a circle, semi-circle, etc.) on a lower surface thereof configured to engage a hole or recess 1202 defined in the blank 1200, to help align and/or maintain the position of the blank 1200 relative to the jig 1325 during stamping.

Figure 44:
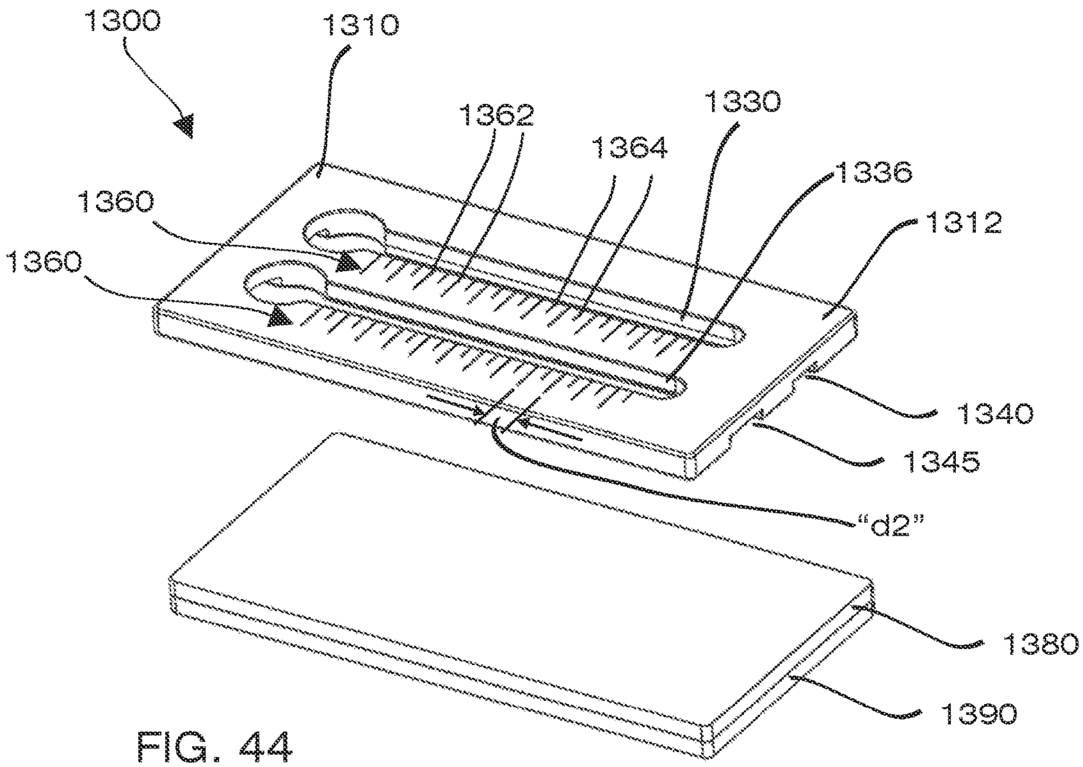
FIG. 44 is a perspective view of the first jig of FIG. 43 detached from two plates of a first jig assembly of the stamping kit of FIG. 41.
Figure 45:
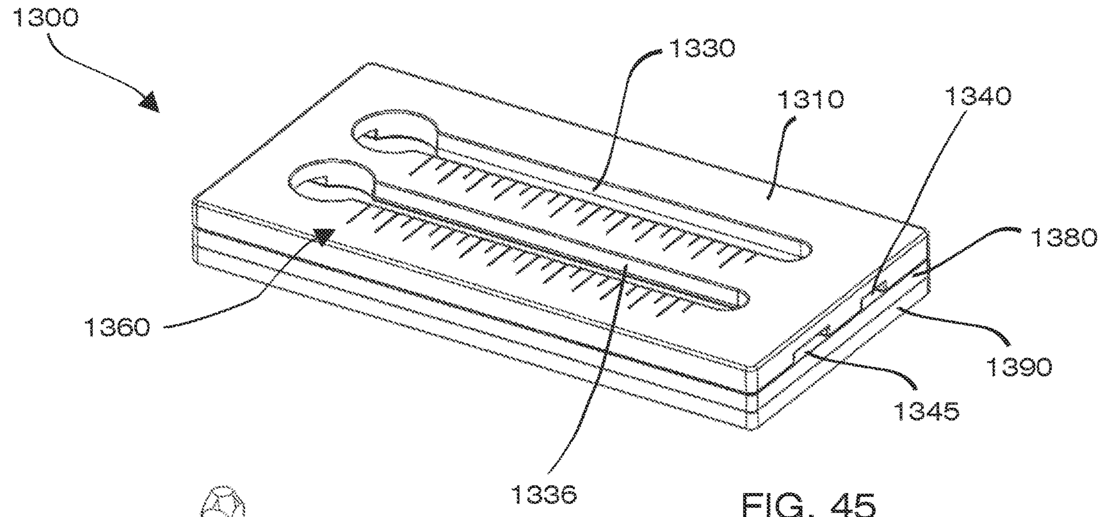
FIG. 45 is a perspective, assembled view of the first jig assembly of the stamping kit of FIG. 41.
Figure 46:
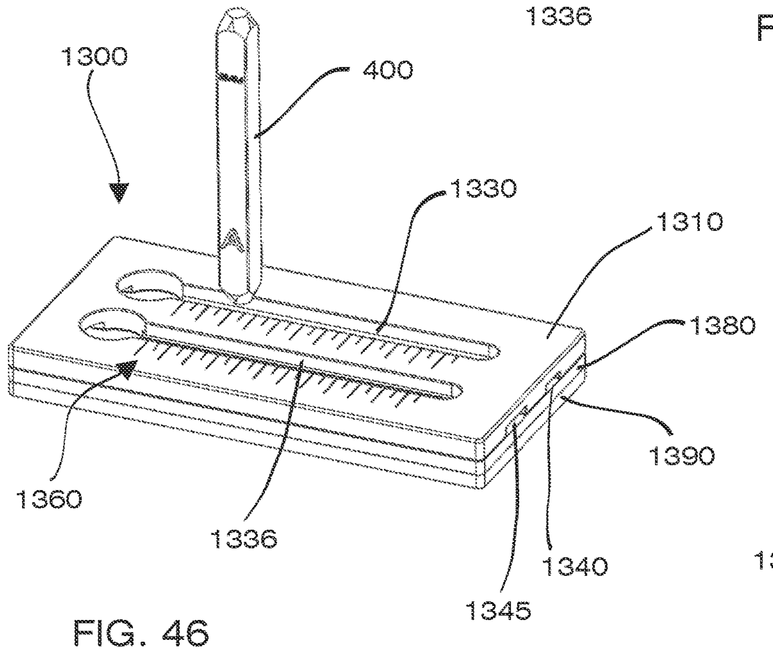
FIG. 46 is a perspective view of the first jig assembly of FIG. 41 along with a stamp of the stamping kit positioned adjacent a first slot of the first jig.

The plurality of alignment marks 1360 is also shown in FIGS. 41-50. With particular reference to FIG. 44, the alignment marks 1360 are positioned on the upper surface 1312 of the jig 1310 adjacent the first stamping slot 1330 and adjacent the second stamping slot 1336. Moreover, the alignment marks 1360 may be in contact with a wall defining the first stamping slot 1330 and with a wall defining the second stamping slot 1336. The alignment marks 1360 are affixed to the jig 1310 (e.g., etched into the jig 1310, printed on the jig 1310, etc.) and/or included on a sticker 1370 (FIG. 42), for instance, such that the sticker 1370 including the alignment marks 1360 is attachable to the jig 1310. In embodiments, the alignment marks 1360 on the sticker 1370 are spaced differently from the alignment marks 1360 that are affixed to the jig 1310. Alternatively, the alignment marks 1360 on the sticker 1370 are spaced the same as the alignment marks 1360 that are affixed to the jig 1310, or there are no alignment marks 1360 affixed to the jig 1310.

The alignment marks 1360 facilitate accurate placement of the stamps 400 relative to the stamping slots 1330, 1336 to help ensure proper spacing of the characters of the stamps 400 onto the blanks 1200*a*, 1200*b*. More particularly, the alignment marks 1360 act as a guide for a user to position the stamp 400 along or in juxtaposition therewith (see FIGS. 41 and 49, for example) to help achieve desired placement of the characters.

Additionally, the illustrated embodiment shows a particular spacing of the alignment marks 1360 of the jig 1310. In FIGS. 41-50, and with particular reference to FIG. 44, the alignment marks 1360 include first alignment marks 1362 and second alignment marks 1364, where the first alignment marks 1362 are longer than the second alignment marks 1364. In embodiments, the second alignment marks 1364 indicate the mid-point of two adjacent first alignment marks 1362. During use, a user may align the stamp marker 430 of the stamp 400 (FIG. 5) with the second alignment marks 1364 (as shown), and/or may align the stamp marker 430 with the first alignment marks 1362. When using a stamp 400 with no stamp marker 430, the user may center the stamp 400 between adjacent first alignment marks 1362 or between adjacent second alignment marks 1364, based on a visual estimation, for instance. It is envisioned that the different sizes of the first alignment marks 1362 and the second alignment marks 1364 help users keep track of the position they are up to as they move the stamp 400 along the stamping slots 1330, 1336, for example.

Figure 47:
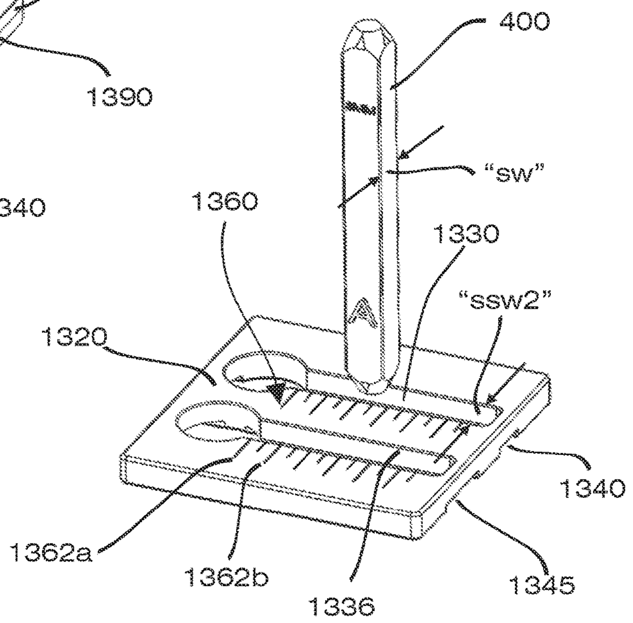
FIG. 47 is a perspective view of the second jig of FIG. 41 along with a stamp of the stamping kit positioned adjacent a first slot of the second jig.
Figure 48:
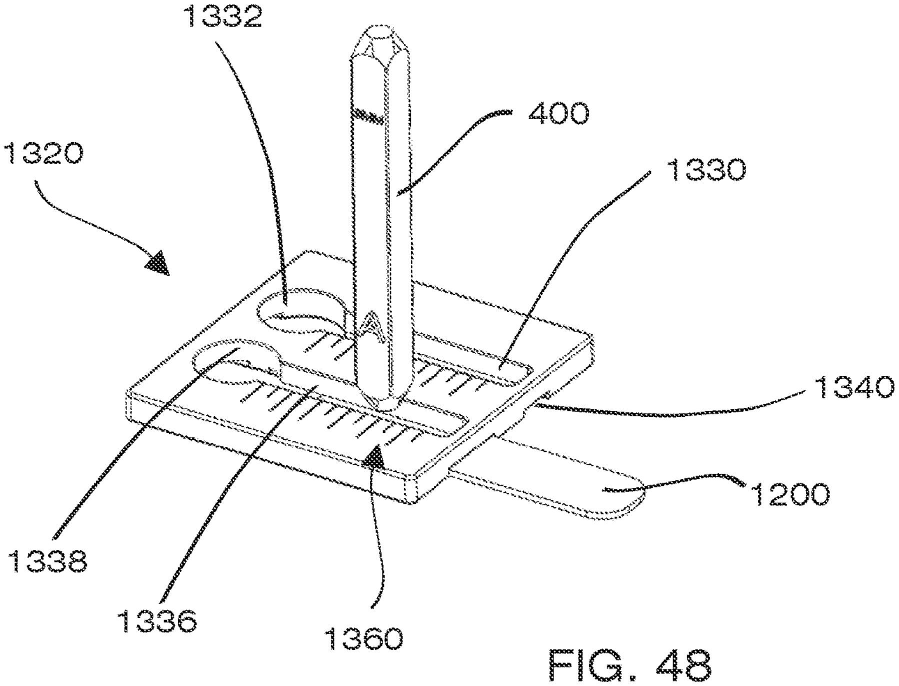
FIG. 48 is a perspective view of the second jig of FIG. 41 along with a stamp of the stamping kit positioned adjacent a second slot of the second jig, and a blank positioned beneath the jig.
Figure 49:
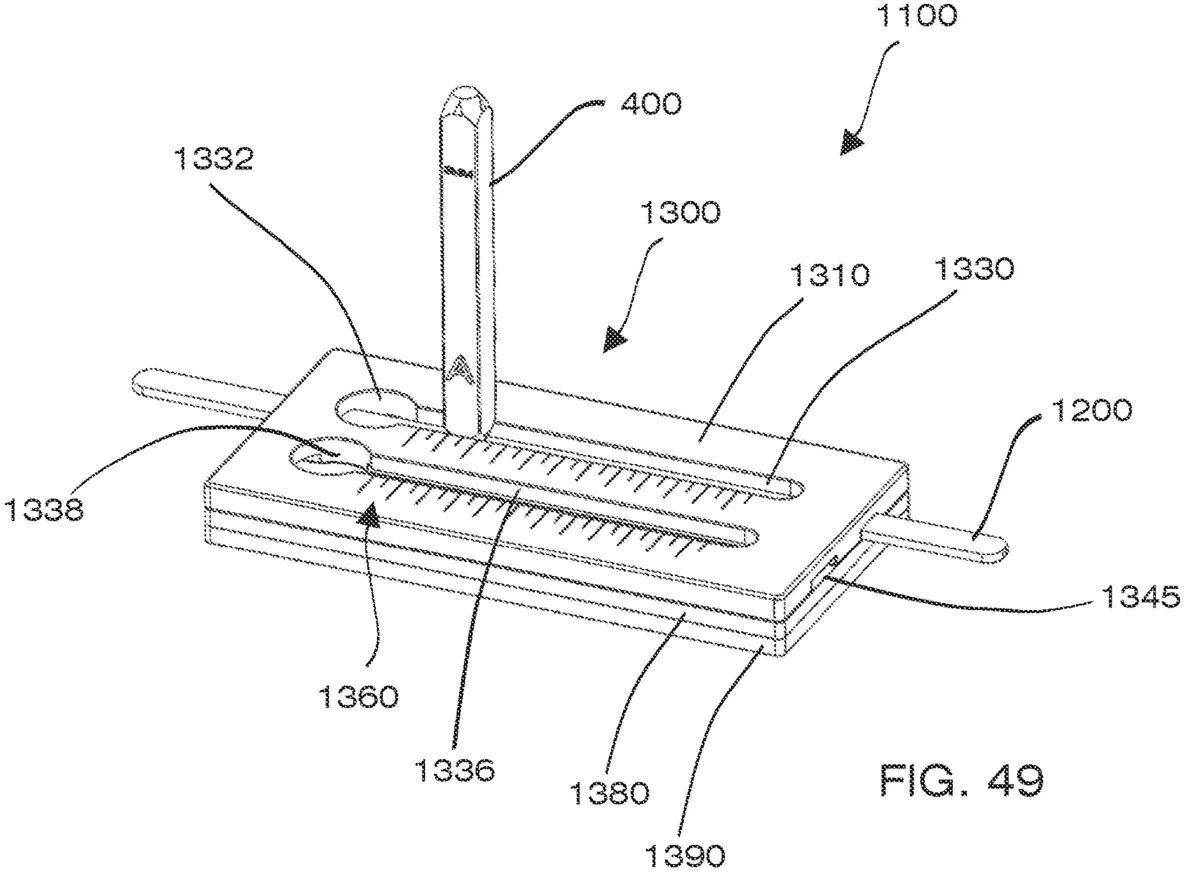
FIG. 49 is a perspective view of the first jig assembly of FIG. 41 along with a stamp of the stamping kit positioned within the first slot of the first jig, and a blank positioned within a first slot of the first jig.

Adjacent first alignment marks 1362 are spaced a distance "d2" apart from each other (FIG. 44). In embodiments, the distance "d2" is equal to or less than the width "sw" of the stamp 400 (and a width "ssw2" of the stamping slots 1330, 1336). That is, the width "sw" of the stamp 400 (which is approximately equal to the width "ssw2" of the stamping slots 1330, 1336 to ensure a tight fit) is equal to or less than the distance between one first alignment mark 1362*a* and a second first alignment mark 1362*b*, for instance (FIG. 47). In embodiments where the distance "d2" is less than the width "ssw2" of the stamping slots 1330, 1336, the spacing of characters can be optimized since the width of the character is generally desired to be wider than the space between characters. For instance, the width "sw" of the stamp 400 may be between about 6.0 mm and about 6.4 mm, and may be equal to about 6.2 mm; the width "ssw2" of the stamping slots 1330, 1336 may be between about 6.2 mm and about 6.8 mm, and may be equal to about 6.5 mm; and the distance "d2" between adjacent first alignment marks 1362 may be between about 2.8 mm and about 3.2 mm, and may be equal to about 3.0 mm. Additionally, the width of the character on the stamp 400 (e.g., the smaller stamp 400*a*) may be between about 2.8 mm and about 3.2 mm, and may be equal to about 3.0 mm. These sizes are only provided as examples; sizes for each of these values may be outside of the described ranges without departing from the scope of the present disclosure.

With reference to FIGS. 41, 42, 44-46 and 49-50, the illustrated embodiment of the jig assembly 1300 includes the first plate 1380 and the second plate 1390. The first plate 1380 is positioned on the lower surface 1314 of the jig 1310 and is made from a metal (e.g., steel). The first plate 1380 provides a solid surface under the blank(s) 1200, which helps ensure successful stamping. The second plate 1390 is positioned beneath the first plate 1380 and is made from rubber or a similar material to help absorb vibrations during stamping, to help deaden the sound of stamping, to help prevent the jig assembly 1300 from moving during stamping, and to help protect the surface beneath the second plate 1390.

In disclosed embodiments, the first plate 1380 is affixed to the jig 1310, and/or the second plate 1390 is affixed to the first plate 1380. In other disclosed embodiments, the first plate 1380 is removably attachable to the jig 1310 (e.g., via magnets). In other disclosed embodiments, the jig 1310 is positionable on the first plate 1380 with no means to attach the first plate 1380 to the jig 1310 (e.g., FIG. 50). It is additionally disclosed that the jig assembly 1300 does not include the first plate 1380 and/or does not include the second plate 1390 (e.g., FIGS. 43, 47 and 48). It is further envisioned that the jig 1310 is usable with the first plate 1380 and not the second plate 1390, or is usable with the second plate 1390 and not the first plate 1380.

The present disclosure also includes methods of using the stamping kit 100, or components thereof, as discussed hereinabove. Additionally, the present disclosure also includes methods of using the stamping kit 1100, or components thereof, as discussed hereinabove.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended hereto.

The invention claimed is:

1. A jig assembly, comprising:

a jig including an upper surface, a lower surface, a first side surface, a second side surface, and a first stamping slot, and a first card slot, the first card slot extending between the first side surface and the second side surface, the first stamping slot extending from the upper surface and configured to removably accept a portion of a first stamp therein, the first stamping slot extending from the upper surface to the first card slot; and a plurality of alignment marks configured for positioning on the upper surface of the jig and adjacent the first stamping slot of the jig, the plurality of alignment marks configured to facilitate accurate placement of a first stamp relative to the first stamping slot.

2. The jig assembly according to claim 1, wherein the jig includes a second stamping slot, the second stamping slot extending from the upper surface of the jig and configured to removably accept a portion of a first stamp therein.

3. The jig assembly according to claim 1, wherein the first stamping slot including a first portion and a second portion, the first portion configured to removably accept a portion of a first stamp therein, and the second portion configured to removably accept a portion of a second stamp therein, wherein the first portion of the first stamping slot is unable to accept the portion of the second stamp therein.

4. The jig assembly according to claim 1, wherein the first stamping slot includes a first portion and a larger second portion, the first portion configured to receive a first sized stamp, and the second portion configured to receive a second sized stamp, the second portion being larger than the first portion.

5. The jig assembly according to claim 1, further including a first plate configured for positioning in contact with the lower surface of the jig.

6. The jig assembly according to claim 5, wherein the first plate magnetically engages the lower surface of the jig.

7. The jig assembly according to claim 5, further including a second plate configured for positioning in contact with the first plate, wherein the first plate is made from steel and the second plate is made from rubber.

8. The jig assembly according to claim 1, wherein the plurality of alignment marks includes a plurality of first alignment marks and a plurality of second alignment marks, each first alignment mark of the plurality of first alignment marks being longer than each second alignment mark of the plurality of second alignment marks, adjacent first alignment marks are spaced a first distance apart from each other, wherein the first stamping slot defines a width in a direction from a front surface of the jig to a rear surface of the jig, and wherein the first distance is less than the width of the first stamping slot.

9. The jig assembly according to claim 1, wherein the alignment marks are affixed to the jig.

10. The jig assembly according to claim 1, wherein the alignment marks are attachable to the jig.

11. A jig, comprising:

an upper surface;

a lower surface;

a first stamping slot defined in the upper surface and extending toward the lower surface, the first stamping slot configured to removably accept a portion of a first stamp therein;

a first card slot extending between a first side surface and a second side surface, the first stamping slot extending from the upper surface to the first card slot; and a plurality of alignment marks disposed on the upper surface and adjacent the first stamping slot, the plurality of alignment marks configured to facilitate accurate placement of a first stamp relative to the first stamping slot.

12. The jig according to claim 11, wherein the first stamping slot including a first portion and a second portion, the first portion extending a first distance in a direction from a front surface of the jig to a rear surface of the jig, the second portion extending a second distance in a direction from the front surface of the jig to the rear surface of the jig, wherein the second distance is larger than the first distance.

13. The jig according to claim 11, wherein the plurality of alignment marks includes a plurality of first alignment marks and a plurality of second alignment marks, each first alignment mark of the plurality of first alignment marks being longer than each second alignment mark of the plurality of second alignment marks, adjacent first alignment marks are spaced a first distance apart from each other, wherein the first stamping slot defines a width in a direction from a front surface of the jig to a rear surface of the jig, and wherein the first distance is less than the width of the first stamping slot.

14. A jig assembly, comprising:

a jig including an upper surface, a lower surface, a first side surface, a second side surface, a first stamping slot, and a second stamping slot, the first stamping slot extending from the upper surface and configured to removably accept a portion of a first stamp therein, the second stamping slot extending from the upper surface and configured to removably accept a portion of a first stamp therein; and a plurality of alignment marks configured for positioning on the upper surface of the jig and adjacent the first stamping slot of the jig, the plurality of alignment marks configured to facilitate accurate placement of a first stamp relative to the first stamping slot.

15. The jig assembly according to claim 14, wherein the jig includes a first card slot and a second card slot, the first card slot defining a first length extending between the first side surface of the jig and the second side surface of the jig, the first stamping slot extending from the upper surface of the jig to the first card slot, the second card slot defining a length extending between the first side surface of the jig and the second side surface of the jig, the second stamping slot extending from the upper surface of the jig to the second card slot.

16. The jig assembly according to claim 15, wherein the first card slot defines a first width extending perpendicularly to the first length, the second card slot defines a second width extending perpendicularly to the second length, the second width being greater than the first width.

17. A jig assembly, comprising:

a jig including an upper surface, a lower surface, a first side surface, a second side surface, and a first stamping slot, the first stamping slot extending from the upper surface and configured to removably accept a portion of a first stamp therein, wherein the first stamping slot includes a first portion and a larger second portion, the first portion configured to receive a first sized stamp, and the second portion configured to receive a second sized stamp, the second portion being larger than the first portion; and a plurality of alignment marks configured for positioning on the upper surface of the jig and adjacent the first stamping slot of the jig, the plurality of alignment marks configured to facilitate accurate placement of a first stamp relative to the first stamping slot.

18. A jig, comprising:

an upper surface;

a lower surface;

a first stamping slot defined in the upper surface and extending toward the lower surface, the first stamping slot configured to removably accept a portion of a first stamp therein, wherein the first stamping slot including a first portion and a second portion, the first portion extending a first distance in a direction from a front surface of the jig to a rear surface of the jig, the second portion extending a second distance in a direction from the front surface of the jig to the rear surface of the jig, wherein the second distance is larger than the first distance; and a plurality of alignment marks disposed on the upper surface and adjacent the first stamping slot, the plurality of alignment marks configured to facilitate accurate placement of a first stamp relative to the first stamping slot.

* * * * *